(12) United States Patent
Nearman et al.

(10) Patent No.: US 7,869,198 B1
(45) Date of Patent: Jan. 11, 2011

(54) MULTIPLE SEAL ELECTRONIC DISPLAY MODULE HAVING DISPLACEMENT SPRINGS

(75) Inventors: Nathan L. Nearman, Brookings, SD (US); Ryan J. Nielsen, Brookings, SD (US); Kent S. Miller, Brookings, SD (US); Mark D. Dennis, Dell Rapids, SD (US); Bradley D. Rinschen, Brookings, SD (US); Douglas P. Tvedt, Brookings, SD (US); Lenny A. Sik, Brookings, SD (US); Kurt L. Peters, Brookings, SD (US); Brian W. Kroll, White, SD (US); Derek J. Heronimus, Brookings, SD (US); David G. Philips, Chester, SD (US)

(73) Assignee: Daktronics, Inc., Brookings, SD (US)

( * ) Notice: Subject to any disclaimer, the term of this patent is extended or adjusted under 35 U.S.C. 154(b) by 115 days.

(21) Appl. No.: 12/381,361

(22) Filed: Mar. 11, 2009

(51) Int. Cl.
*G06F 1/16* (2006.01)
(52) U.S. Cl. .................. 361/679.01; 292/201; 400/570; 40/452; 251/331
(58) Field of Classification Search ............... 292/216, 292/169.14, 201, 24, 26, 25; 400/693, 564, 400/88, 691, 206.2, 570; 40/605, 452, 450; 422/99, 102; 248/95; 251/249.5, 331, 129.03; 361/697.06, 697.05, 679.21, 679.27, 679.43
See application file for complete search history.

(56) References Cited

U.S. PATENT DOCUMENTS

| | | | |
|---|---|---|---|
| 6,773,042 B2* | 8/2004 | Spurr et al. | 292/216 |
| 7,033,097 B2* | 4/2006 | Petteruti et al. | 400/693 |
| 7,055,271 B2* | 6/2006 | Lutz et al. | 40/605 |
| 2009/0295174 A1* | 12/2009 | Corrales et al. | 292/169.14 |

* cited by examiner

*Primary Examiner*—Hung V Duong
(74) *Attorney, Agent, or Firm*—Schwegman, Lundberg & Woessner P.A.

(57) ABSTRACT

The present invention provides a multiple seal electronic display module having displacement springs for distributed use as major components of an electronic sign. Displacement springs are provided to displace the electronic display module from the front of an electronic sign mounting panel until latching mechanisms are properly actuated in order to secure the electronic display module to the electronic sign mounting panel and thus provide a visual clue indicating proper or improper securing. A configured front edge seal provides for multiple surface sealing of multiple components consisting of, but not limited to, a louver panel, an LED circuit board, and a housing. A rear seal is also provided to seal the rear of the electronic display module to the electronic sign mounting panel. Input and output signal jack base seals and a power jack base seal provide effective seals between the housing and the signal and power jacks.

35 Claims, 29 Drawing Sheets

MULTIPLE SEAL ELECTRONIC DISPLAY MODULE HAVING DISPLACEMENT SPRINGS

CROSS REFERENCES TO RELATED APPLICATIONS

This patent application is also related to patent application Ser. No. 10/688,3040 filed on Oct. 17, 2003, entitled "Electronic Display Module Having a Four-Point Latching System for Incorporation into an Electronic Sign and Process", now U.S. Pat. No. 7,055,271.

BACKGROUND OF THE INVENTION

1. Field of the Invention

The present invention pertains to electronic sign displays, and more particularly, is for a multiple seal electronic display module having multiple latch assemblies used in close association with displacement springs mounted to such latch assemblies.

2. Description of the Prior Art

Prior art electronic signs include electronic display modules which are secured to a common mounting panel and which are aligned to adjacent electronic display modules. Occasionally, installers or service personnel would fail to ensure that an electronic display module was properly secured to the mounting panel, in which case, alignment of the faces of the electronic display modules having multiple LEDs would appear to be satisfactory, but with use over time, vibrations, wind or other forces would cause an unsecured electronic display module to shift out of alignment, thereby resulting in poor visual perception or poor continuity of the plurality of electronic display modules making up an electronic sign. A totally unsecured electronic display module might even separate from the mounting panel creating an extensive visual gap in the electronic sign, but in a worse case scenario, the electronic display module could fall from the electronic sign and injure workers or electronic sign observers. Other problems relating to the operating environment around and about an electronic sign exist whereby water, moisture, debris and the like can enter the confines of the electronic display modules which comprise an electronic sign, thereby causing a partial or total malfunction. One obvious point of entry of such environmental substances is between the planar components of an electronic display module, such as, but not limited to, the seal between a main housing and a louver panel, whereby such substances can contaminate an internally located LED circuit board or other closely associated components. Another point of entry of unwanted environmental substances can be associated with the sealing between signal jacks and power jacks with a housing, whereby the use of otherwise waterproof jacks and plugs can be thwarted simply by the fact that water can contaminate the base of the jack which is mounted on the LED circuit board. The LED circuit board and components can also be compromised by the entry of water or debris. The use of unsealed programming jacks can also lead to contamination. Often, prior art sealing methods have been provided by the use of adhesives and the like, the application of which is labor intensive and can be messy or inconsistent depending on the application thereof. Clearly what is needed is an improved electronic display module having features which alleviate the problems associated with prior art electronic display modules.

SUMMARY OF THE INVENTION

The general purpose of the present invention is to provide a multiple seal electronic display module having displacement springs for incorporation into use with an electronic sign.

The present invention provides a multiple seal electronic display module with latch assemblies having mounted displacement springs where such latch assemblies are distributed at points or locations about the electronic display module. The multiple seal electronic display module having displacement springs, also referred to herein as the electronic display module, also includes major components, assemblies and other components including, but are not limited to, a louver panel, a front edge seal, an LED circuit board, a main housing, signal jack base seals, a power jack base seal, an overmolded programming jack seal and a rear seal.

The electronic display module provided by the present invention is fastened to a mounting panel of an electronic sign using latch assemblies in a manner closely associated with that shown and described in U.S. Pat. No. 7,055,271 entitled "Electronic Display Module Having a Four-Point Latching System for Incorporation into an Electronic Sign and Process", by one or more of the assignees, where the latch assemblies of the invention are used to securingly engage the geometry of a mounting panel in order to attach the electronic display module to the mounting panel of an electronic sign. Displacement springs are mounted to the latch assemblies, where the displacement springs interface with and create an interference between the mounting panel of the electronic sign and the electronic display module. During the installation of the electronic display module to the mounting panel, the displacement springs temporarily offer a mounting resistance and serve to displace the electronic display module from the mounting panel until the tension of each displacement spring is overcome and fastening is completed. The displacement springs are compressed when the electronic display module is secured to the mounting panel of the electronic sign by actuation of latching mechanisms in the latch assemblies, whereby the electronic display module is no longer displaced from the mounting panel and is brought into a suitable intimate and secure contact with the mounting panel. Electronic display modules which are partially or otherwise not properly secured jut out from and stand out from the other secured and aligned electronic display modules and thus are determined to be unsecured by such a visual cue. Use of the displacement springs can also be useful during the de-installation of an electronic display module, whereby the displacement springs of the electronic display module can forwardly displace the electronic display module from the mounting panel when the latch mechanisms are operated to disengage the latches from the mounting panel, whereby grasping and maneuvering of the electronic display module can readily be accomplished.

The present invention offers a sealing with respect to input and output signal jack bases, as well as for a power jack base where flexible seals are mounted between the LED circuit board and the housing of the electronic display module. The flexible seals are canted inwardly to provide positive and continuous contact about the base of such jacks. The seal offered by the walls of the flexible seals is enhanced and strengthened by a forcible positive contact with the geometry of the housing. An overmolded programming jack seal is also provided. A geometrically configured front edge seal provides for sealing between the louver panel and the housing. A geometrically configured rear seal provides for a sealing between the housing and the mounting panel of an electronic sign.

According to one or more illustrations of the present invention, there is provided a multiple seal electronic display module having displacement springs including features which are located, mounted or otherwise attached to the front of and extend in close proximity about a configured latch housing to, in part, form the present invention. Components which are associated with, located, mounted or otherwise attached to the front of the housing include a front edge seal having one or more sealing features aligned in continuous intimate contact within a continuous channel in the front of the housing, an LED circuit board of lesser overall dimension with respect to the continuous channel aligned with the front of the housing and in contact with the front edge seal, a louver panel aligned in close proximity to the LED circuit board and in intimate contact with the front edge seal, whereby the front edge seal provides a mutual seal and is in intimate contact between the louver panel and the housing while also providing a complete seal about the LED circuit board. Components which are located, mounted or otherwise attached to the rear of the housing include opposed horizontally aligned latch assemblies, signal jack seals, a power jack seal, a programming jack cover seal and a rear seal, the latter of which is used to seal against the mounting panel of an electronic sign.

One significant aspect and feature of the multiple seal electronic display module having displacement springs, the present invention, is the use of multiple latching assemblies having latching mechanisms for attaching the electronic display module to the mounting panel of an electronic sign.

Still another significant aspect and feature of the present invention is an electronic display module having multiple latches with onboard self-contained latching mechanisms.

Another significant aspect and feature of the present invention is an electronic display module having multiple latches with opposing latch mechanisms which are operated by an actuator gear positioned between opposing actuator arms.

A still further significant aspect and feature of the present invention is an electronic display module having multiple latches whereby the geometry of an end latch housing influences the deployment of a latch in order to allow a restricted or unrestricted latch movement with respect to the over center relationship of components closely associated with the actuator arm and the latch.

A further significant aspect and feature of the present invention is an electronic display module having multiple latches incorporating an over center relationship of components closely associated with an actuator arm and latch whereby during latch deployment, the over center relationship is restricted and then unrestricted to cause the latch arms of a latch to be actuated in a linear straight direction over the structure of a mounting panel assembly followed by the rotation of the latch to cause the latch arms to securingly impinge the structure of an electronic sign mounting panel.

Another significant aspect and feature of the present invention is the use of latching assemblies having displacement springs.

Another significant aspect and feature of the present invention is the use of displacement springs to forcibly position an electronic display module away from the mounting panel of an electronic sign in order to indicate an electronic display module nonalignment or the lack of a latch mechanism engagement of the electronic display module with the mounting panel of an electronic sign.

Another significant aspect and feature of the present invention is the use of displacement springs to assist in unmounting an electronic display module by exerting an outwardly directed force to outwardly position the electronic display module in order that it may be readily grasped by an operator and thence removed.

Another significant aspect and feature of the present invention is the provision of an LED module which is entirely sealed against the entry of water and debris.

Another significant aspect and feature of the present invention is the use of a front edge seal located between a louver panel and a housing where the front edge seal can contain multiple sealing edges and a groove which frictionally engage a continuous channel in the housing.

Another significant aspect and feature of the present invention is the use of a front edge seal between a louver panel and a housing and against an LED circuit board, wherein the LED circuit board is sealed within the confines of the louver panel, the housing, and the front edge seal.

Another significant aspect and feature of the present invention is the use of a seal at the rear of a housing in order to seal the front surface of an electronic sign mounting panel.

Another significant aspect and feature of the present invention is the use of signal jack base seals to seal the signal jack bases to the housing and the use of a power jack base seal to seal the power jack base to the housing.

Another significant aspect and feature of the present invention is the use of one or more signal jack base seals and a power jack base seal, each having continuous lips for locating, aligning and mounting between the LED circuit board and the housing.

Another significant aspect and feature of the present invention is the use of signal jack base seals having continuous inwardly canted walls, the inwardly located edge of which seals continuously against the signal jack bases, and the use of a power jack base seal having a continuous inwardly canted wall, the inwardly located edge of which seals continuously against the power jack base.

Another significant aspect and feature of the present invention is the augmentation and seal efficacy of the signal jack base seals and the power jack base seal, whereby a continual force is provided against such base seals by an intimate forced contact with the surrounding geometry of the housing.

Another significant aspect and feature of the present invention is the use of an overmolded seal which is used to seal a programming jack access opening.

Having thus briefly described one or more embodiments of the present invention, and having mentioned some significant aspects and features of the present invention, it is the principal object of the present invention to provide a multiple seal electronic display module having displacement springs for incorporation into use with an electronic sign.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 17 is a partially exploded view of the jack base seal, a portion of the housing, a portion of the LED circuit board and the input signal jack mounted thereto;

FIG. 18 shows the input signal jack base seal aligned and in intimate contact with the rear surface of the LED circuit board and the input signal jack seal aligned about the input signal jack;

FIG. 19 shows the input signal jack base seal aligned to and in intimate contact with the rear surface of the LED circuit board, the input signal jack seal aligned about the input signal jack, and a portion of the housing aligned over and about the input signal jack and aligned over and about and in intimate contact with the input signal jack seal;

FIG. 21 is a partially exploded view of the power jack base seal, the housing, a portion of which is shown, the LED circuit board, a portion of which is shown, and the power jack;

FIG. 22 shows the power jack base seal aligned and in intimate contact with the rear surface of the LED circuit board and the power jack base seal aligned about the power jack;

FIG. 23 shows the power jack base seal aligned and in intimate contact with the rear surface of the LED circuit board, the power jack base seal aligned about the power jack, and a portion of the housing aligned over and about the power jack and aligned over and about and in intimate contact with the power jack base seal;

DETAILED DESCRIPTION OF THE PREFERRED EMBODIMENTS

Figure 1:
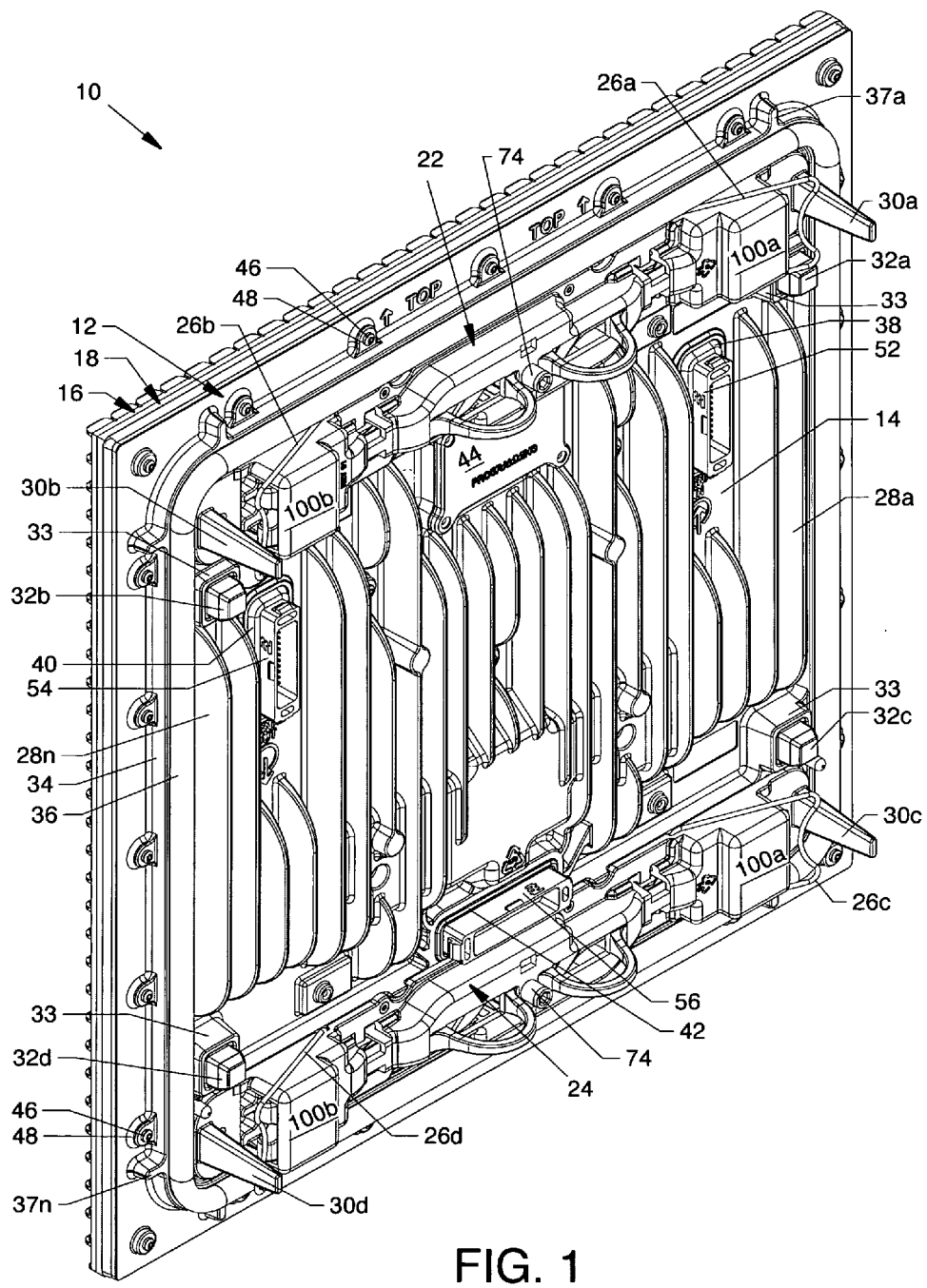
FIG. 1 is a rear view of a multiple seal electronic display module having displacement springs for incorporation in an electronic sign, the present invention.

FIG. 1 is a rear view of a multiple seal electronic display module having displacement springs for incorporation into use with an electronic sign and which together with the process for incorporating it into an electronic sign constitutes the present invention. The multiple seal electronic display module having displacement springs 10, also referred to as the electronic display module 10, is used for incorporation with an electronic sign. The components of the electronic display module 10 include an integral multiple faceted one-piece housing 12, preferably constructed of magnesium or other suitable material, and including a centrally located panel 14 forming the greater part of the housing 12 and being disposed between the edges of the housing 12. A flexible and pliable front edge seal 18 (partially visible) provides for a seal between the housing 12 and an overmolded louver panel 16 (partially visible). The front edge seal 18 and the louver panel 16 are located forward of the housing 12. An LED circuit board 20 (FIG. 2) of a lesser overall dimension than the housing 12 and the louver panel 16 is fittingly housed between the louver panel 16 and the housing 12 and is sealingly bordered therebetween within the adjacent confines completed by the use of the front edge seal 18. The front edge seal 18 also provides for sealing between the edge of the LED circuit board 20 and the housing 12, as well as between the LED circuit board 20 and a continuous lip in the louver panel 16, such sealing arrangements being explained and shown later in detail. The panel 14 is mostly planar and includes recesses and other geometrically associated features. The invention also includes other components and features many of which are located to the rear of the housing 12, i.e., to the rear of the panel 14, and includes, but is not limited to, opposed horizontally situated latch assemblies 22 and 24 suitably attached thereto, such as by screws. A plurality of like displacement springs 26a-26d are attached to the ends of the latch assemblies 22 and 24, respectively, as shown. A plurality of vertically disposed heat dissipation fins 28a-28n extend outwardly and rearwardly from the panel 14.

Shown in close proximity to the ends of the latch assemblies 22 and 24 are a plurality of elongated locator posts 30a-30d and a plurality of short locator posts 32a-32d extending outwardly and rearwardly from bases 33 located on the panel 14 for directly aligning the housing 12 with an electronic sign mounting panel 136 (FIG. 29) to which the electronic display module 10 is secured. Sealing devices other than the front edge seal 18 are located to the rear of or extend rearwardly from or through openings in the housing 12. A continuous channel 34 extends rearwardly from the panel 14 of the housing 12 to accommodate a flexible and pliable rear seal 36 which preferably can be formed in place and which is used for sealing the housing 12 of the electronic display module 10 against the mounting panel 136 (FIG. 29) of an electronic sign. A plurality of keying features 37a-37n are integral with and extend between the outer perimeter of the channel 34 and the panel 14. A flexible input signal jack base seal 38, a flexible output signal jack base seal 40, and a flexible power jack base seal 42 extend outwardly and rearwardly through the panel 14 and are used to seal about the base of each of the seals to the panel 14 in order to prevent the entry of water or debris through corresponding associated openings in the panel 14. An overmolded programming jack seal 44 is used to seal a programming jack opening. A plurality of suitable fasteners 46 extend though a plurality of shouldered pads 48 to threadingly engage alignment posts 50 (FIG. 2) extending rearwardly from the louver panel 16.

Figure 2:
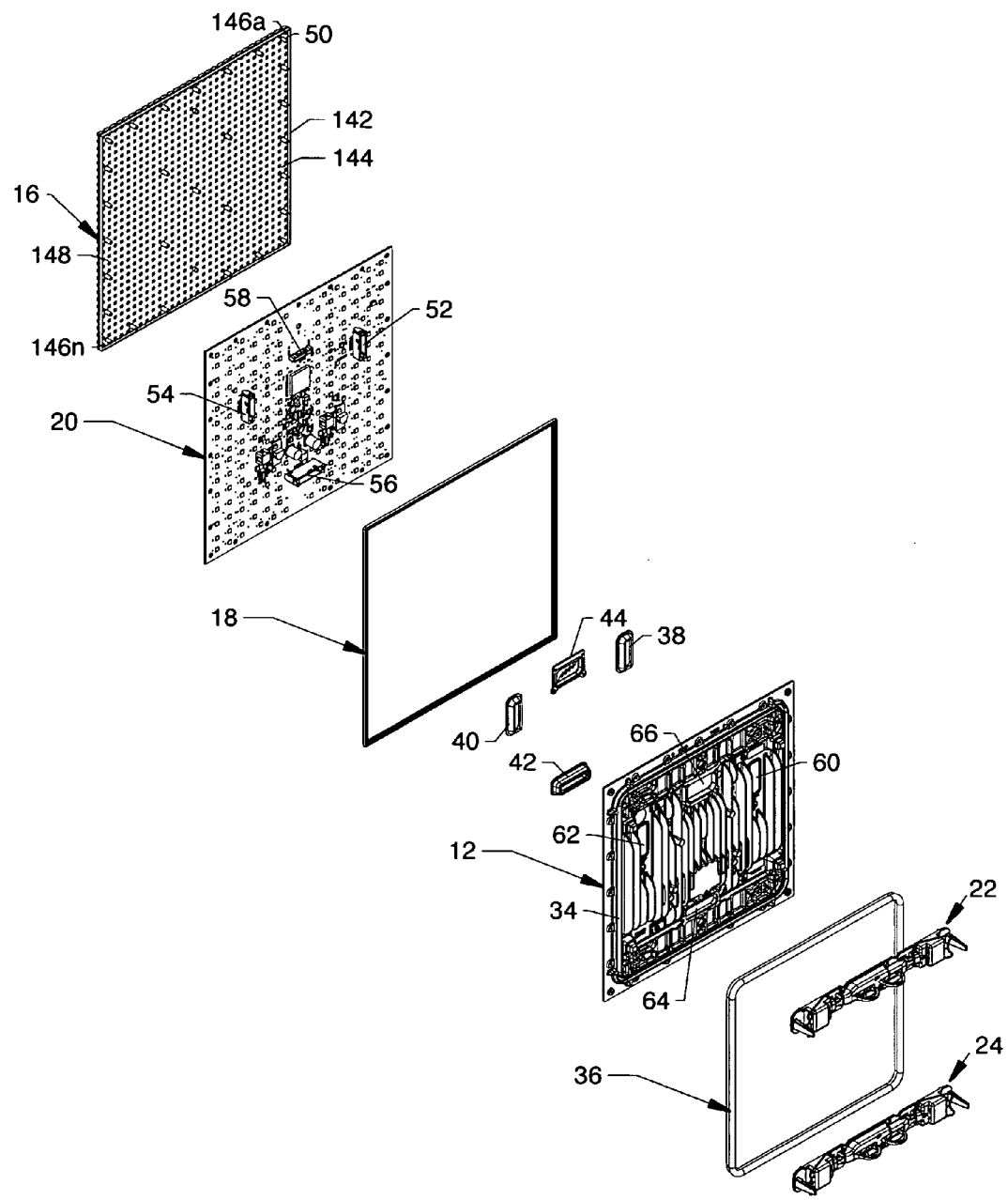
FIG. 2 is an exploded rear view of the multiple seal electronic display module having displacement springs.

FIG. 2 is an exploded rear view of the multiple seal electronic display module having displacement springs 10. Shown in particular are features associated with the sealing of the invention, as well as other features. The LED circuit board 20 includes jacks or other closely associated and aligned devices connected to and extending rearwardly therefrom including an input signal jack 52, an output signal jack 54, a power jack 56, and a programming jack 58 corresponding to and in close association and alignment with openings in the panel 14 of the housing 12 including an input signal jack opening 60, an output signal jack opening 62, a power jack opening 64 and a programming jack opening 66, respectively, as well as being in close association and alignment with the input signal jack base seal 38, the output signal jack base seal 40, the power jack base seal 42, and the overmolded programming jack seal 44, respectively.

Figure 3:
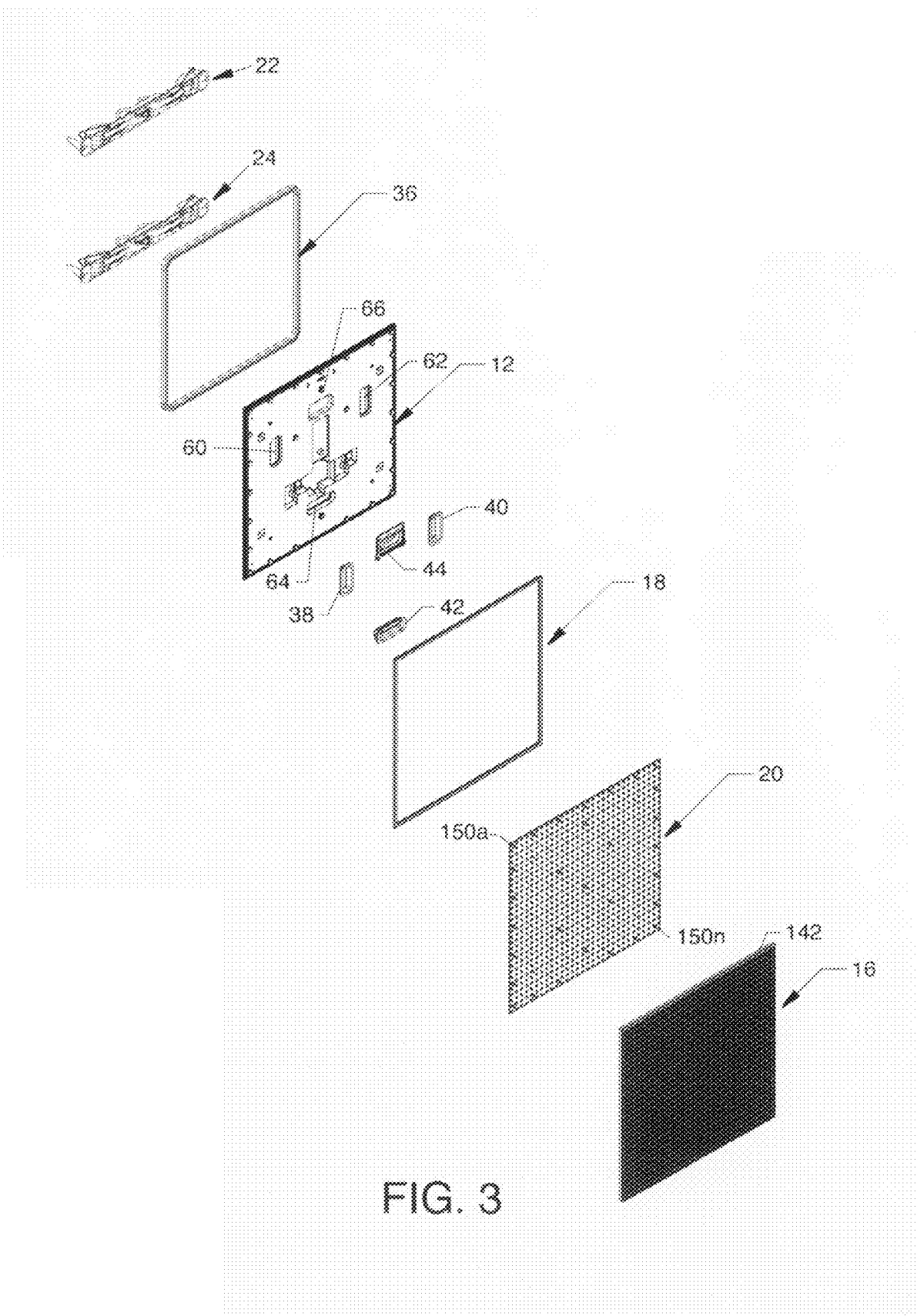
FIG. 3 is an exploded front view of the multiple seal electronic display module having displacement springs.

FIG. 3 is an exploded front view of the multiple seal electronic display module having displacement springs 10.

Figure 4:
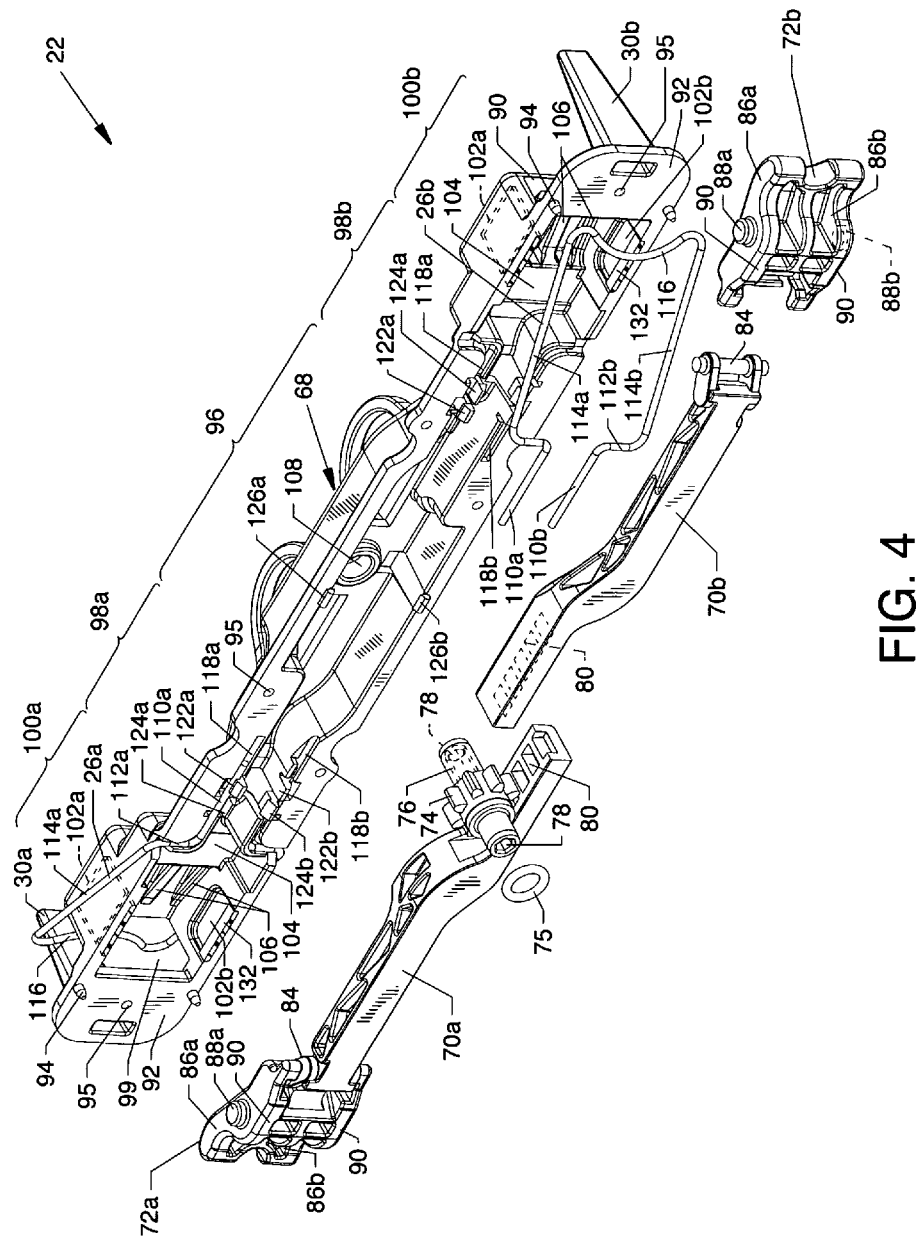
FIG. 4 is an exploded front view of a latch assembly illustrating the displacement springs as well as the features used to connect the displacement springs to a latch housing.

FIG. 4 is an exploded front view of the latch assembly 22 having multiple major components including, but not limited to, a latch housing 68, displacement springs 26a and 26b and operational components including, but not limited to, similarly constructed actuator arms 70a and 70b, similar latches 72a and 72b, and an actuator gear 74 having an O-ring seal 75. The latch assembly 22 is attached to the rear of the housing 12 by a plurality of screws and uses part of the structure of the housing 12 to support the operational components of the latch assembly 22. The configured actuator arms 70a and 70b are operated simultaneously in opposite directions by the rotation of the actuator gear 74 having a shaft 76 with hex holes 78 at each end, such hex holes 78 being accessible from the front or from the back of the electronic display module 10. The inboard portion of each of the similarly constructed actuator arms 70a and 70b includes a toothed rack 80 for meshing with the teeth of the actuator gear 74. The outboard ends of the actuator arms 70a and 70b are pivotally attached by over center linkages 84 to the interior and inboard portions of latch arms 86a and 86b of the latches 72a and 72b, respectively. Each of the similarly constructed latches 72a and 72b includes opposed and mutually connected latch arms 86a and 86b and also includes a top pivot post 88a and a bottom pivot post 88b (FIG. 6) vertically aligned with and extending outwardly from a central portion of the latch arms 86a and 86b. Flat slide surfaces 90 are included along one edge of the latches 72a and 72b to provide for a sliding transition of the latches 72a and 72b along some of the short support panels 128a-128n of the housing 12 (FIG. 7). The actuator arms 70a and 70b, the latches 72a and 72b, and the actuator gear 74 are aligned within the confines of the latch housing 68 and are in intimate contact with some of the short support panels 128a-128n of the panel 14 of the housing 12 (FIG. 7). The outboard ends of the latches 72a and 72b, i.e., the latch arms 86a and 86b, are used to forcibly and intimately contact features of an electronic sign to which the electronic display module 10 is attached, as later described in detail.

Figure 5:
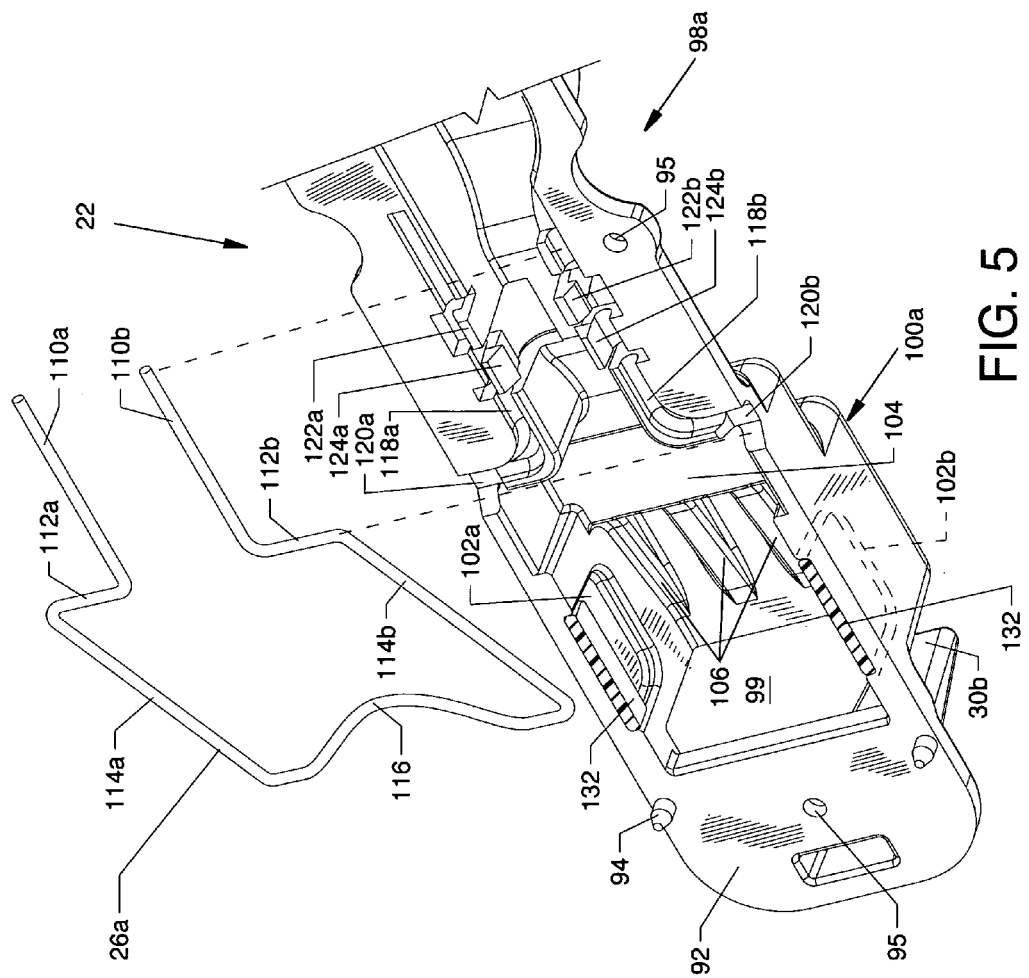
FIG. 5 is a view of one end of a latch assembly showing the relationship of the structure of the displacement spring to the structure of the mounting recesses in the base of the latch housing.

The latch housing 68 is used as a guide to assist in the housing of the operational components of the latch assembly including the actuator arms 70a and 70b, the latches 72a and 72b, and the actuator gear 74 in close communication with the panel 14 of the housing 12. The latch housing 68 includes an interrupted planar base 92 having a plurality of alignment pins 94 extending outwardly therefrom, as well as a plurality of holes 95 extending therethrough for mounting of the latch housing 68, i.e., the latch assembly 22 to the panel 14 of the housing 12. Also shown extending from the base 92 are the locator posts 30a and 30b. The one-piece latch housing 68 is comprised of a plurality of connected housing segments extending from the base 92 including a central latch housing 96, opposite intermediate latch housings 98a and 98b adjoining and flanking the central latch housing 96, and end latch housings 100a and 100b adjoining and flanking the intermediate latch housings 98a and 98b, respectively. The sidewalls of the end latch housings 100a and 100b include opposite track recesses 102a and 102b formed in association with tabs 132 of FIG. 7 extending from the housing 12 which accommodate the pivot posts 88a and 88b of the latches 72a and 72b, respectively. The forward end of each of the tabs 132 are partially shown in segments extending from a cross section through the tabs 132. As also shown in FIG. 5, the rear walls of the end latch housings 100a and 100b also include a planar surface 104 generally aligned parallel to the base 92 and a plurality of adjoining and multiple connecting ramps 106 aligned at an angle with respect to the base 92, each surface of which serve as guides for use in the variable positioning and orientation of the latches 72a and 72b. The outboard end of the end latch housings 100a and 100b include an opening 99 adjacent to the multiple ramps 106. In general, the end latch housings 100a and 100b accommodate the latches 72a and 72b, the intermediate latch housings 98a and 98b accommodate the longer portions of the actuator arms 70a and 70b, and the central latch housing 96 accommodates the inboard shorter portions of the actuator arms 70a and 70b having the tooth racks 80, as well as accommodating the actuator gear 74. It is noted that a support hole 108 is included at the back side of the central latch housing 96 for accommodation of one end of the shaft 76 of the actuator gear 74. The other end of the shaft 74 accommodates the O-ring seal 75 and is supported by a support hole 134 (FIG. 7) located in the panel 14 of the housing 12 and sealed thereto by the O-ring seal 75.

FIG. 4 also illustrates the displacement springs 26a and 26b, as well as the features used to connect the displacement springs 26a and 26b to the latch housing 68. The displacement spring 26a is shown connected to the base 92 and aligned over and about the end latch housing 100a and the displacement spring 26b is shown disconnected from the base 92 and the end latch housing 100b and distanced therefrom to reveal some of the geometry used for attachment. The displacement springs 26a and 26b include short spring segments 110a and 110b which are aligned at an angle to the general plane of the displacement springs 26a and 26b and are used for mounting of the displacement springs 26a and 26b to the base 92 of the latch housing 68. The displacement springs 26a and 26b also include transverse spring segments 112a and 112b at a right angle to the short spring segments 110a and 110b and at a right angle to the long spring segments 114a and 114b. A curved spring segment 116 extends between the outboard ends of the long spring segments 114a and 114b.

With additional reference to FIG. 5, one end of the latch assembly 22 for accommodating and securing the displacement spring 26a to the base 92 of the latch housing 68 is now described in detail. The displacement springs 26b, 26c and 26d are aligned and connected to the latch housing 68 in the same manner and fashion to corresponding structure. Opposed L-shaped upper and lower mounting recesses 118a and 118b, respectively, are located in and along the base 92 in close proximity to the intermediate latch housing 98a. The long sections of the mounting recesses 118a and 118b accommodate the short spring segments 110a and 110b and the short sections of the mounting recesses 118a and 118b accommodate the transverse spring segments 112a and 112b, respectively. Opposed notches 120a and 120b are located at the edge of the base 92 in alignment with the short section of the mounting recesses 118a and 118b and are also used to accommodate a small portion of the transverse spring segments 112a and 112b. Opposed flexible clasps referred to as spring clasps 122a and 122b, located in and extending forwardly from the intermediate latch housing 98a, are utilized to flexibly engage and then to intimately and capturingly engage the short spring segments 110a and 110b in order to affix the short spring segments 110a and 110b within the upper and lower mounting recesses 118a and 118b, respectively, and to consequently ensure engagement of the transverse spring segments 112a and 112b within the short section of the mounting recesses 118a and 118b and within the notches 120a and 120b. Subsequent to the capture of the displacement spring 26a, the long spring segments 114a and 114b maintain an angular relationship with the base 92 in order that the curved spring segment 116 is spaced at a suitable distance from the base 92, such as viewed in FIG. 4. Such a spaced distance is maintained until the displacement spring 26a is compressed against the mounting panel of an electronic sign and held thereagainst by proper securing of the latch assembly 22. Also shown in FIG. 5 are opposed flexible clasps referred to as actuator arm clasps 124a and 124b located in and extending forwardly from the intermediate latch housing 98a which clasps are utilized to flexibly engage and then to intimately and capturingly and slidingly engage the longer portions of the actuator arms 70a and 70b. Other actuator arm clasps 126a and 126b (FIG. 4) located in the central latch housing 96 are utilized to flexibly engage and then intimately and capturingly engage the shorter portions of the actuator arms 70a and 70b. Although the short spring segments 110a and 110b are secured within the upper and lower mounting recesses 118a and 118b by the spring clasps 122a and 122b, respectively, additional securing therein is also provided. Additional structure is secured over and about the short spring segments 110a and 110b residing in the upper and lower mounting recesses 118a and 118b when the latch housing 68 is suitably secured, such as by screws, against the rear structure of the housing 12, which rear structure is shown and described in FIG. 7 in order to additionally provide for a robust mounting of the displacement spring 26a within the upper and lower mounting recesses 118a and 118b and within the notches 120a and 120b.

Figure 6:
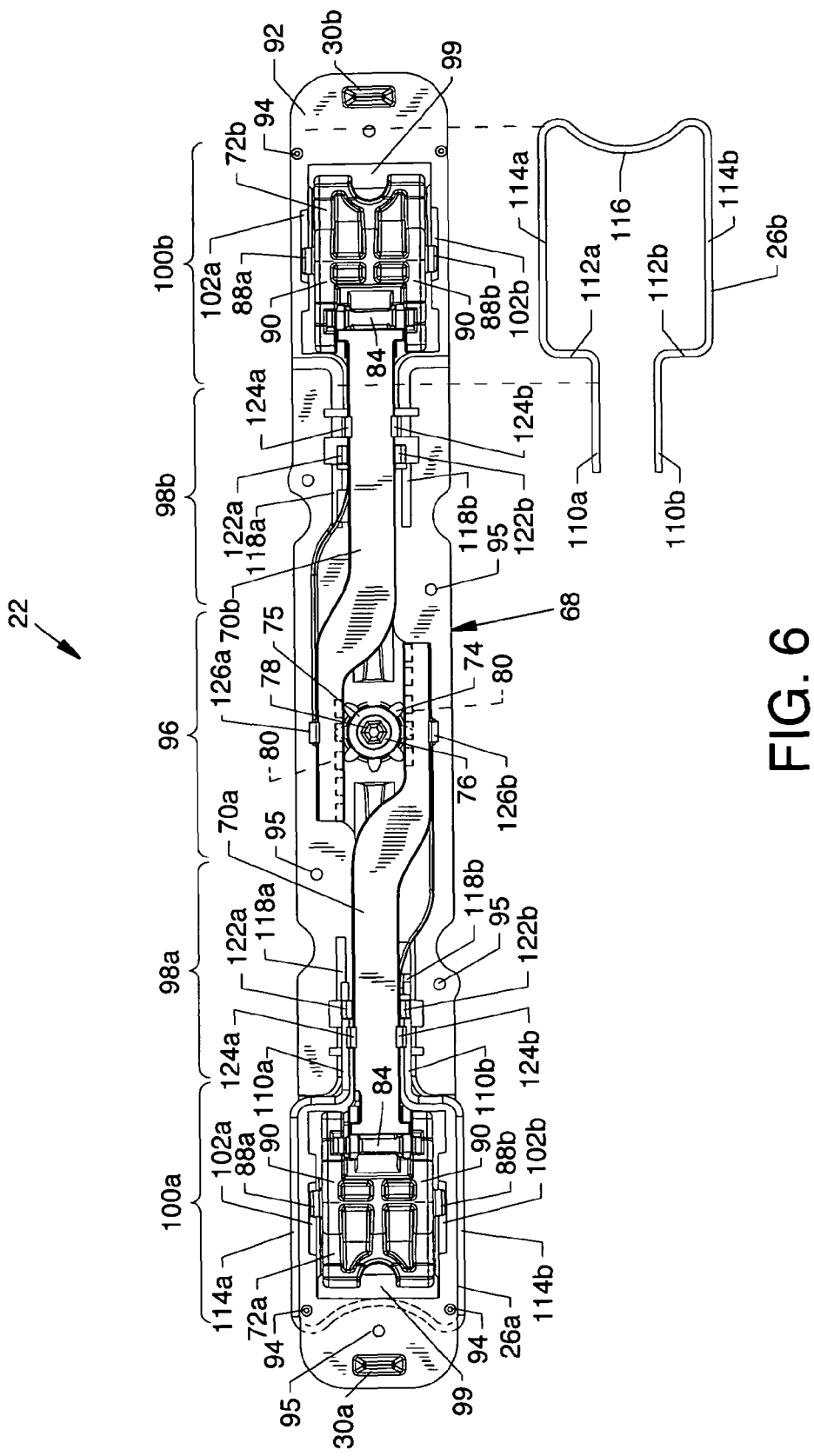
FIG. 6 is a front view of the latch assembly showing the relationship of the operational components of the latch housing.
Figure 7:
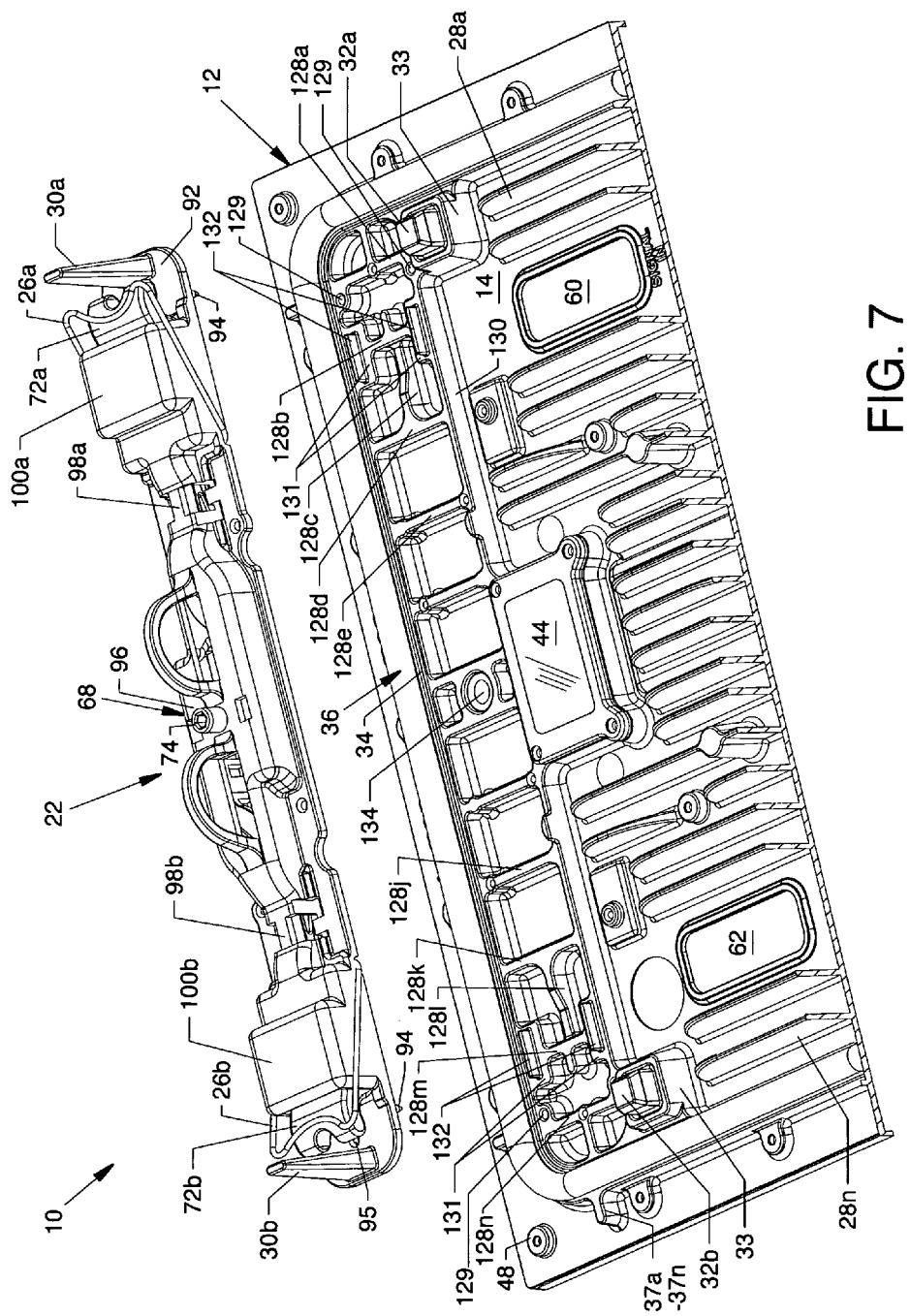
FIG. 7 is a rear view of the upper portion of the electronic display module having displacement springs with a latch assembly offset to reveal the structure which similarly supports each of the latch assemblies.

FIG. 6 is a front view of the latch assembly 22 showing the relationship of the operational components of the latch housing 68. More precisely, the latch 72a is shown residing in the end latch housing 100a, the outboard portion of the actuator arm 70a is shown residing mostly in the immediate latch housing 98a, the inboard portion of the actuator arm 70a including a tooth rack 80 is shown residing mostly in the central latch housing 96, the inboard portion of the actuator arm 70b including a tooth rack 80 is shown residing mostly in the central latch housing 96, the outboard portion of the actuator arm 70b is shown residing mostly in the intermediate latch housing 98b, the latch 72b is shown residing in the end latch housing 100b, and the actuator gear 74 is shown residing in the central latch housing 96 mutually engaging the opposed toothed racks 80 located at the inboard portions of the actuator arms 70a and 70b.

FIG. 7 is a rear view of the upper portion of the electronic display panel 10 with the latch assembly 22 offset to reveal the structure which similarly supports each rear of the latch assemblies 22 and 24. For example, structures are provided extending along the panel 14 of the housing 12 in the form of a plurality of short support panels 128a-128n extending between an elongated support panel 130 and one side of the channel 34 or can be otherwise located along the panel 14. Various short support panels 128a-128n are used in conjunction with and support of components of the latch assembly 22. Some segments of the displacement spring 26a and 26b are secured by contact with some of the short support panels 128a-128n. For example, the support panel 128d is used to intimately contact, support and secure the transverse spring segments 112a and 112b of the displacement spring 26a in order to secure the transverse spring segments 112a and 112b in the short portions of the upper and lower mounting recesses 118a and 118b; and the support panel 128e is used to intimately contact, support and secure the ends of the short spring segments 110a and 110b. Additionally, the support panel 128a is used to support one end of the base 92 of the latch housing 68. Correspondingly, other short support panels 128a-128n are used in the same manner and fashion with like corresponding components of the latch assembly 24. Pad bases 131 also extend rearwardly from the panel 14 as bases for horizontally oriented tabs 132 which extend rearwardly to align with and form one side of the track recesses 102a and 102b of the end latch housings 100a and 100b. The pivot posts 88a and 88b are aligned within and slidingly engage the track recesses 102a and 102b. The pad bases 131 also provide a surface for an intimate and sliding contact with the slide surfaces 90 of the latches 72a and 72b. A multiple radius support hole 134 is aligned between the centrally located short support panels of the plurality of short vertically oriented support panels 128a-128n in order to provide support for one end of the shaft 76 of the actuator gear 74 and to provide an access to the front hex hole 78 of the actuator gear 74. Other alignment tabs and holes are also included along the plurality of short vertically oriented support panels 128a-

128*n* and the elongated support panel 130. In particular, a plurality of holes 129 is provided in some of the short support panels 128*a-n* for accommodating the alignment pins 94 in the base 94 of the latch housing 68.

Figure 8:
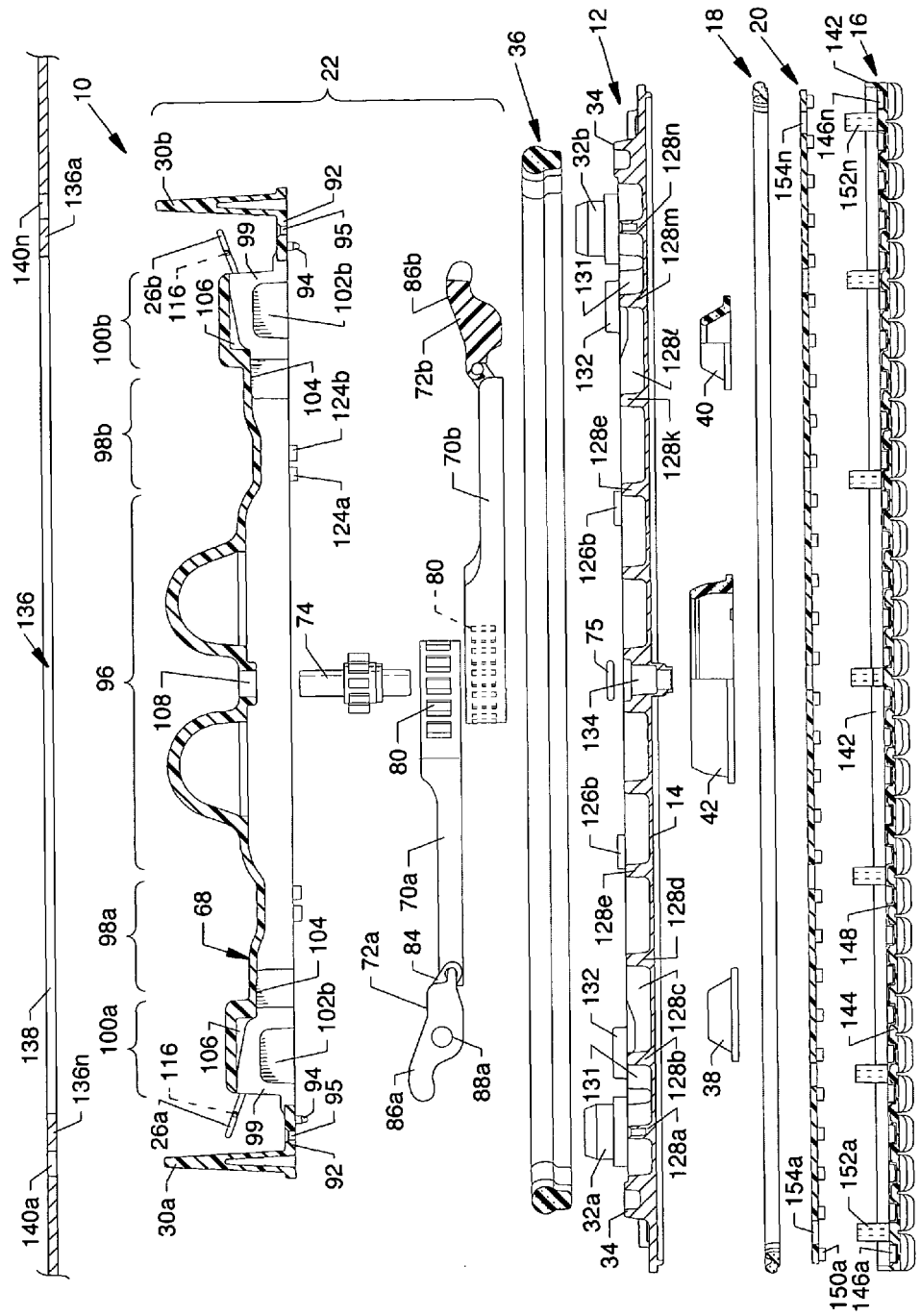
FIG. 8 is an exploded cross section top view of the electronic display module having displacement springs showing the alignment of the major components of the invention.
Figure 29:
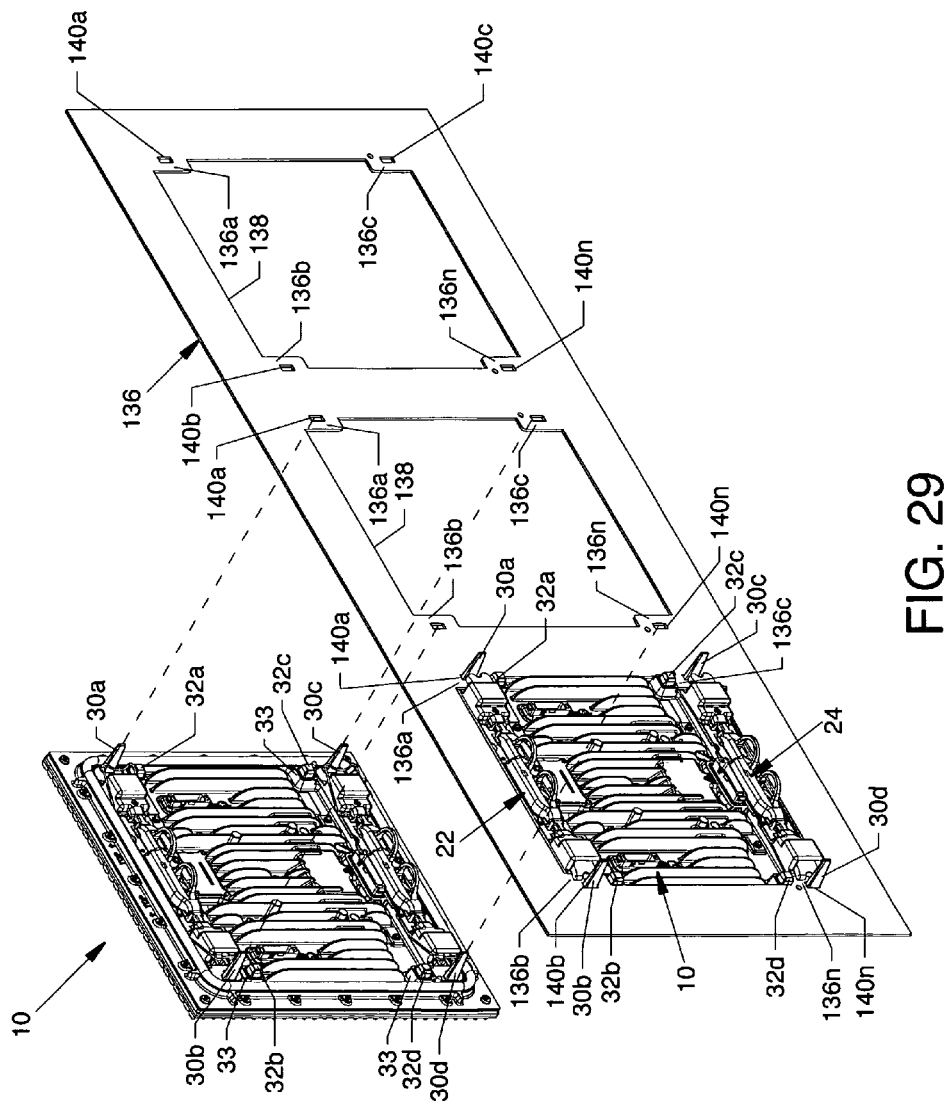

FIG. 8 is an exploded cross section top view of the electronic display module 10 showing the alignment of the major components of the invention including, but not limited to, the latch assembly 22, the housing 12, the rear seal 36, the front edge seal 18, the input signal jack base seal 38, the output signal jack base seal 40, the power jack base seal 42, the LED circuit board 20, and the louver panel 16 in spaced mutual alignment, as well as in spaced alignment of such components to an electronic sign mounting panel 136 in order to form part of the structure for an electronic sign. The components, such as the actuator arms 70*a* and 70*b*, the latch 72*a*, and the actuator gear 74, are shown in full view, and other components, such as the input signal jack base seal 40 and the power jack base seal 42, are shown on segmented view. The electronic sign mounting panel 136 includes a plurality of large openings through which the electronic display modules 10 extend as shown in FIG. 29. A large opening 138 accommodates the structure of the electronic display module 10 which extends rearwardly therethrough and also accommodates the structure of the electronic display module 10 extending therethrough and generally within the periphery of the channel 34 and rear edge seal 36, such as, but not limited to, the latch assemblies 22 and 24, the input signal jack base seal 38, the output signal jack base seal 40, the power jack base seal 42, and the heat dissipation fins 28*a*-28*n*. As viewed in FIG. 29, the electronic sign mounting panel 136 includes corner extension tabs 136*a*-136*n* located at the corners of the large opening 136 which extension tabs are included for providing a contacting interface between the electronic sign mounting panel 136 and the latches 72*a* and 72*b*. Groups of alignment holes 140*a*-140*n* are located in the corner extension tabs 136*a*-136*n* of the electronic sign mounting panel 136. The alignment holes 140*a*-140*n* accommodate the locator posts 30*a*-30*b* extending rearwardly from the electronic display module 10. The planar portion of the edge of the electronic sign mounting panel 136, surrounding the large opening 138, provides an intimate and forcible sealing contact with the rear edge seal 36. The curved spring segments 116 of the displacement springs 26*a*-26*b* (and 26*c*-26*d*) are used to intimately and forcibly contact the front surface of the corner extension tabs 136*a*-136*n* of the electronic sign mounting panel 136 surrounding the large opening 138, as described later in detail. Referring to FIG. 8, the actuator gear 74 has been rotated to position the actuator arms 70*a* and 70*b* inwardly toward and into the central latch housing 96 in order to position the latches 72*a* and 72*b* substantially within the end latch housings 100*a* and 100*b*, respectively. It is noted that the displacement springs 26*a* and 26*b* are shown in the relaxed position and in spaced alignment with the border of the edge of the electronic sign mounting panel 136. Also shown in this illustration as well as in FIG. 7 is the structure of the housing 12 including the short support panels 128*a*-128*n* which, with the previously described structure of the latch housing 68, supports and provides guidance for the actuator arms 70*a* and 70*b* and the latches 72*a* and 72*b* of the latch assembly 22 (and 24).

Figure 14:
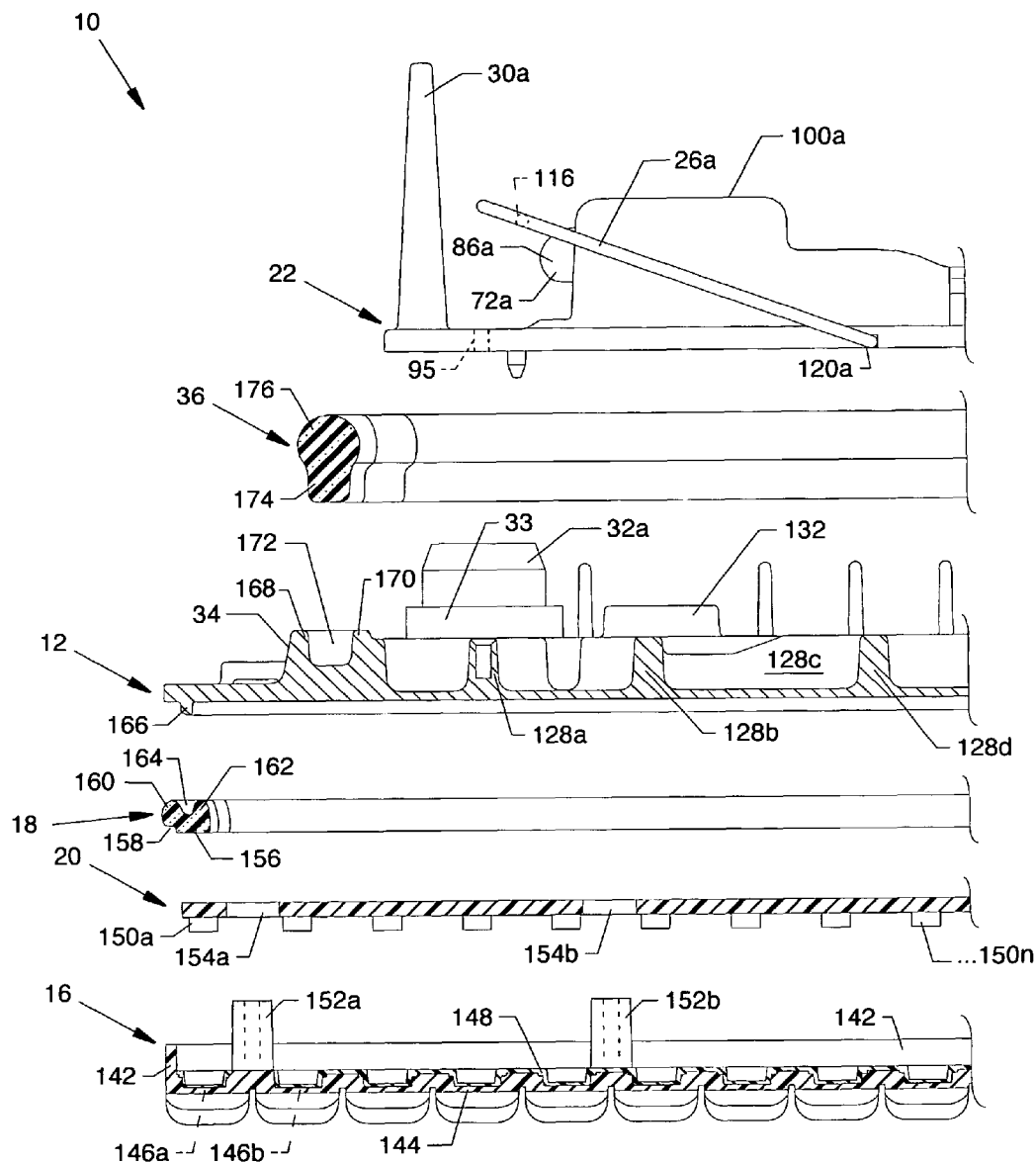
FIG. 14 is an exploded view in partial cross section along line 14-14 of FIG. 9 excluding the electronic sign mounting panel showing sealing structure along and about the front, the edge and the rear of the electronic display module.

Shown in this figure and shown and described in greater detail with reference to an exploded view of the electronic display module 10 shown in FIG. 14 is the louver panel 16 which is constructed in a waterproof manner including a continuous lip 142, a grid panel 144 having a plurality of viewing windows 146*a*-146*n* located between the forward portions of the continuous lip 142, and a clear transparent overmold 148 which adheres to and seals the rear surface of the grid panel 144 and which extends into the viewing windows 146*a*-146*n*. A plurality of LEDs 150*a*-150*n* mounted on the LED circuit board 20 are viewed through the portion of the overmold 148 which extends into the viewing windows 146*a*-146*n*. Also shown are a plurality of alignment/mounting posts 152*a*-152*n* having internal threads which posts extend rearwardly from the grid panel 144 of the louver panel 16 and which posts align with and extend through a plurality of corresponding holes 154*a*-154*a* through the LED circuit board 20. Fasteners 46 shown in FIG. 1 are used to extend through the holes 154*a*-154*a* of the LED circuit board 20 and through the pads 48 and thus through the panel 14 of the housing 12 and into the alignment/mounting posts 152*a*-152*n* to mutually secure the louver panel 16, the LED circuit board 20 and the housing 12, wherein other components are forcibly engaged therebetween as described later in detail. It is noted that the input signal jack base seal 38, the output signal jack base seal 40, and the power jack base seal 42 are locatingly captured and positioned between the LED circuit board 20 and the housing 12 during such joining of the LED circuit board 20 and the housing 12.

Process

Figure 9:
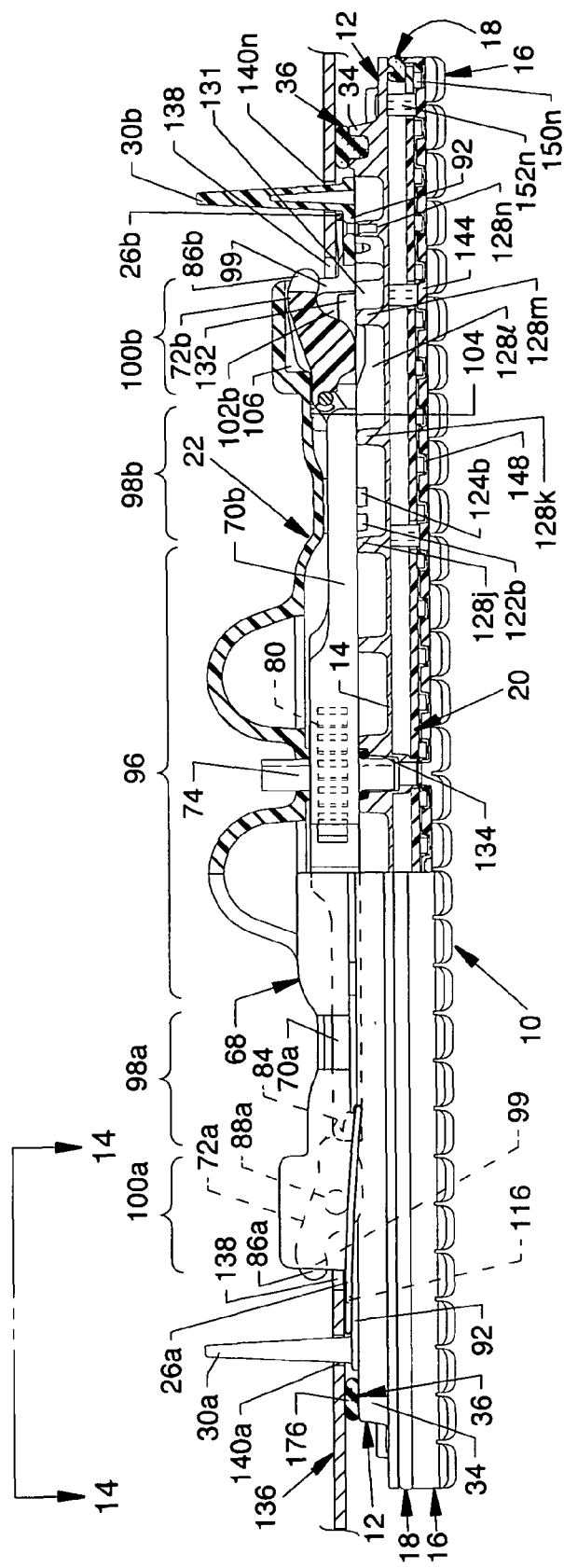
FIG. 9 is an assembled view in partial cross section of the electronic display module having displacement springs engaging, but not secured to, an electronic sign mounting panel in order to form part of the structure of an electronic sign.
Figure 10:
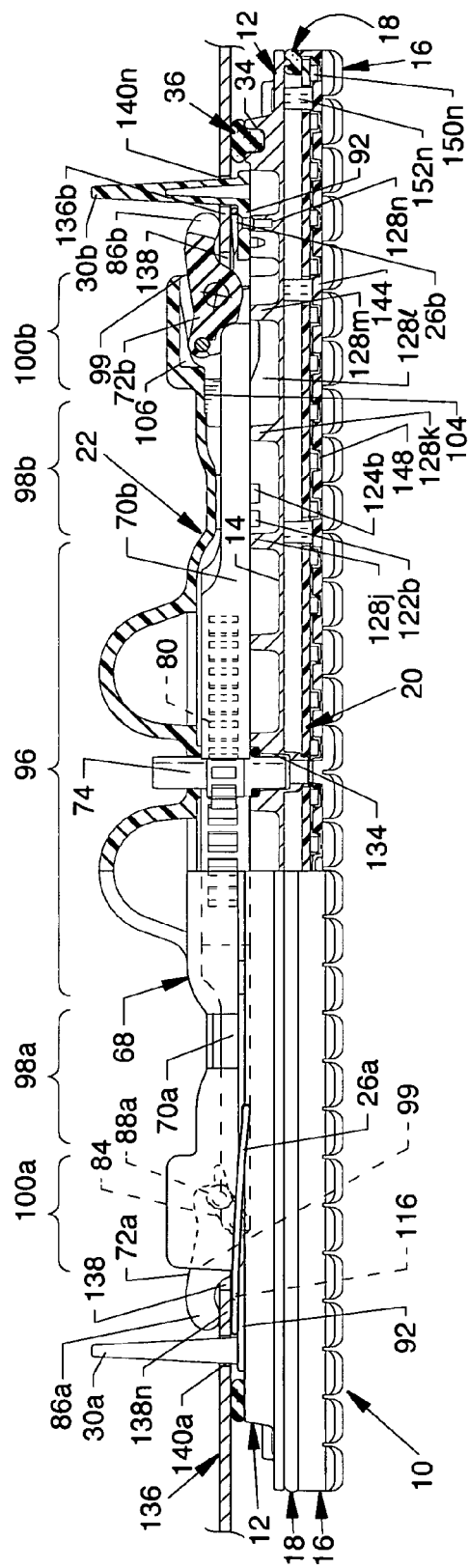
FIG. 10 is an assembled view in partial cross section of the electronic display module having displacement springs fully engaging and secured to the electronic sign mounting panel in order to form part of the structure of an electronic sign.
Figure 11:
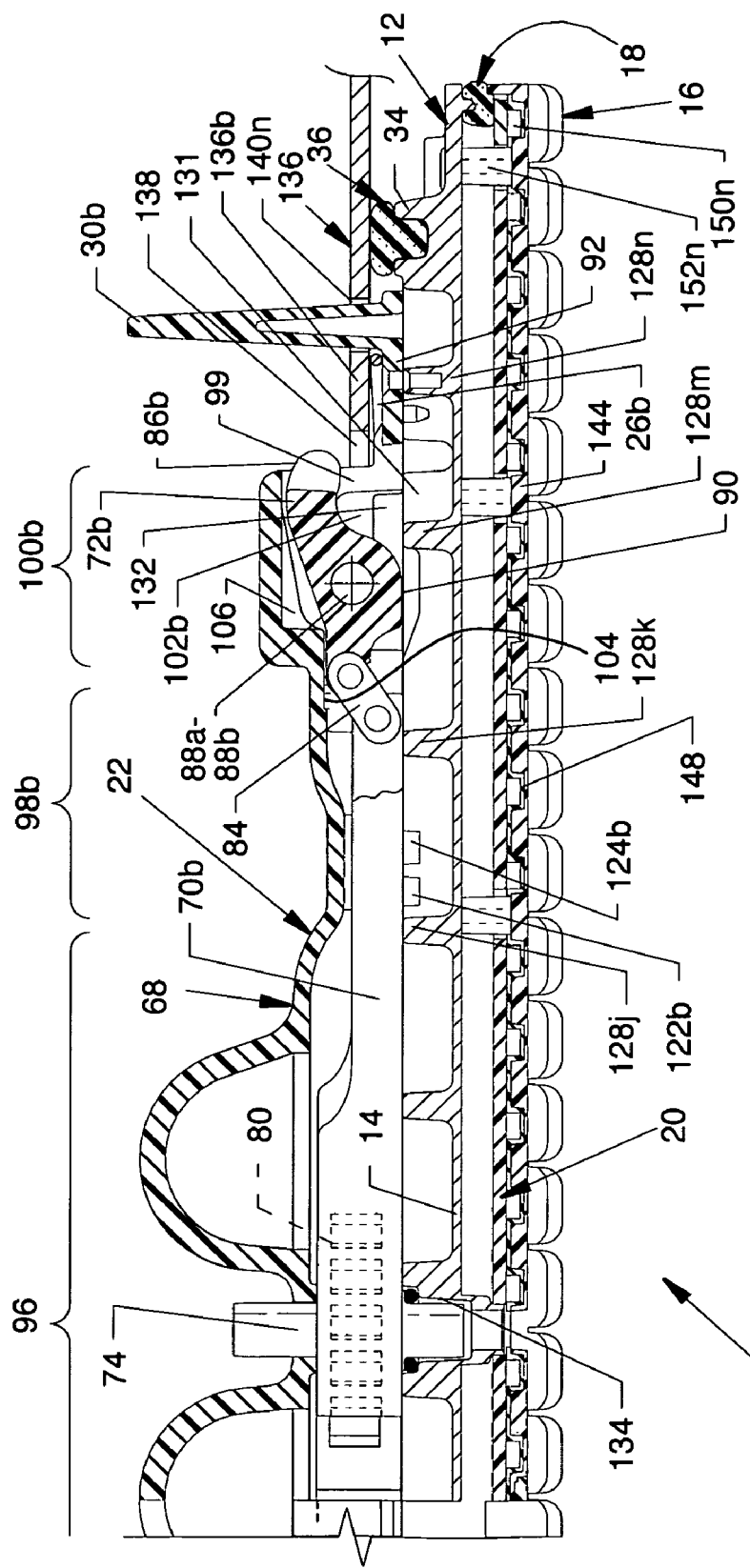
FIG. 11 is an assembled view in partial cross section and in partial cutaway of the electronic display module engaging, but not secured to, the electronic sign mounting panel showing the relationship of one of the actuator arms, the linkage bars and a latch.
Figure 12:
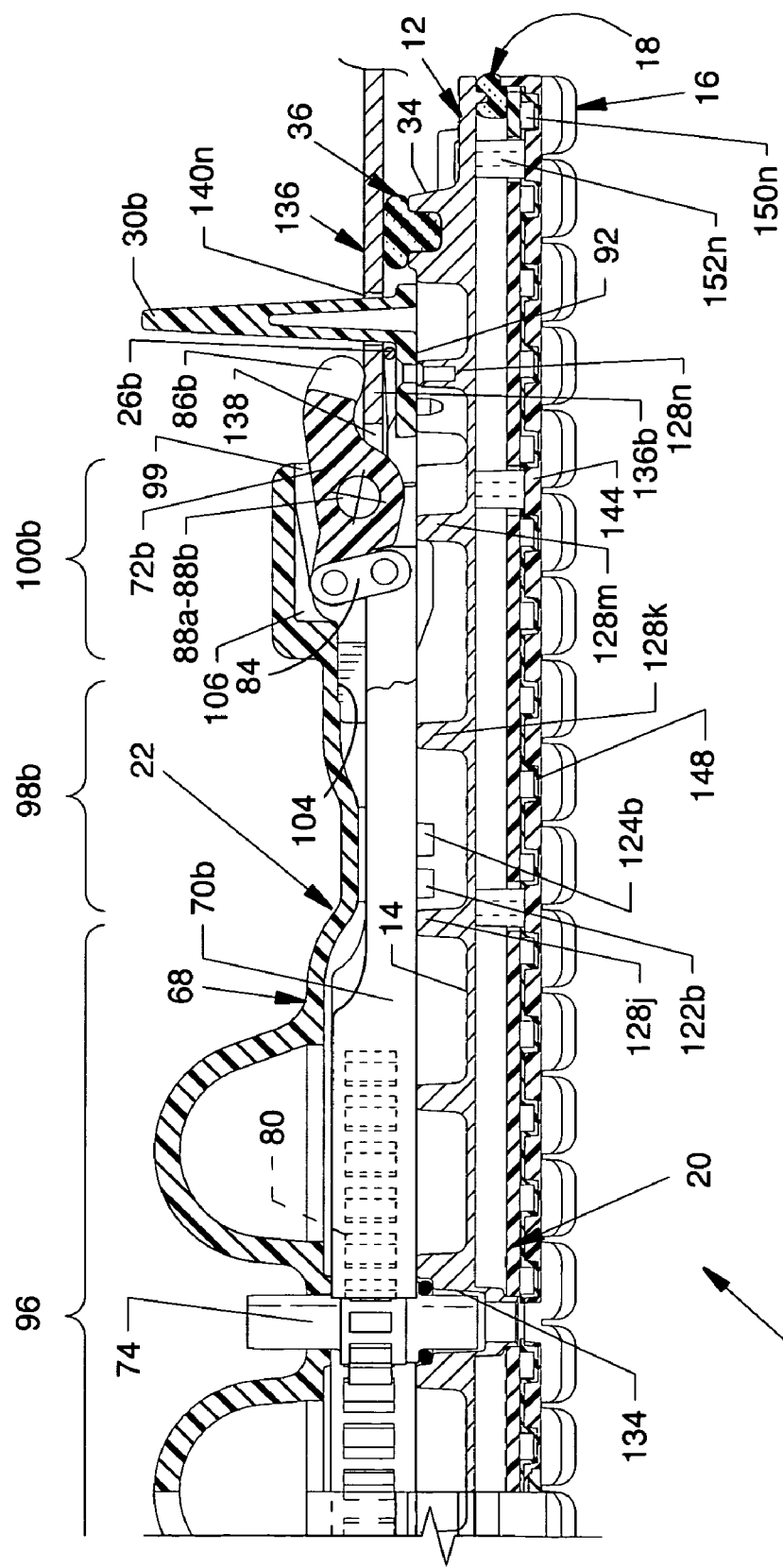
FIG. 12 is an assembled view in partial cross section and in partial cutaway of the electronic display module engaging and secured to the electronic sign mounting panel showing the relationship of one of the actuator arms, the linkage bars and the latch.
Figure 13:
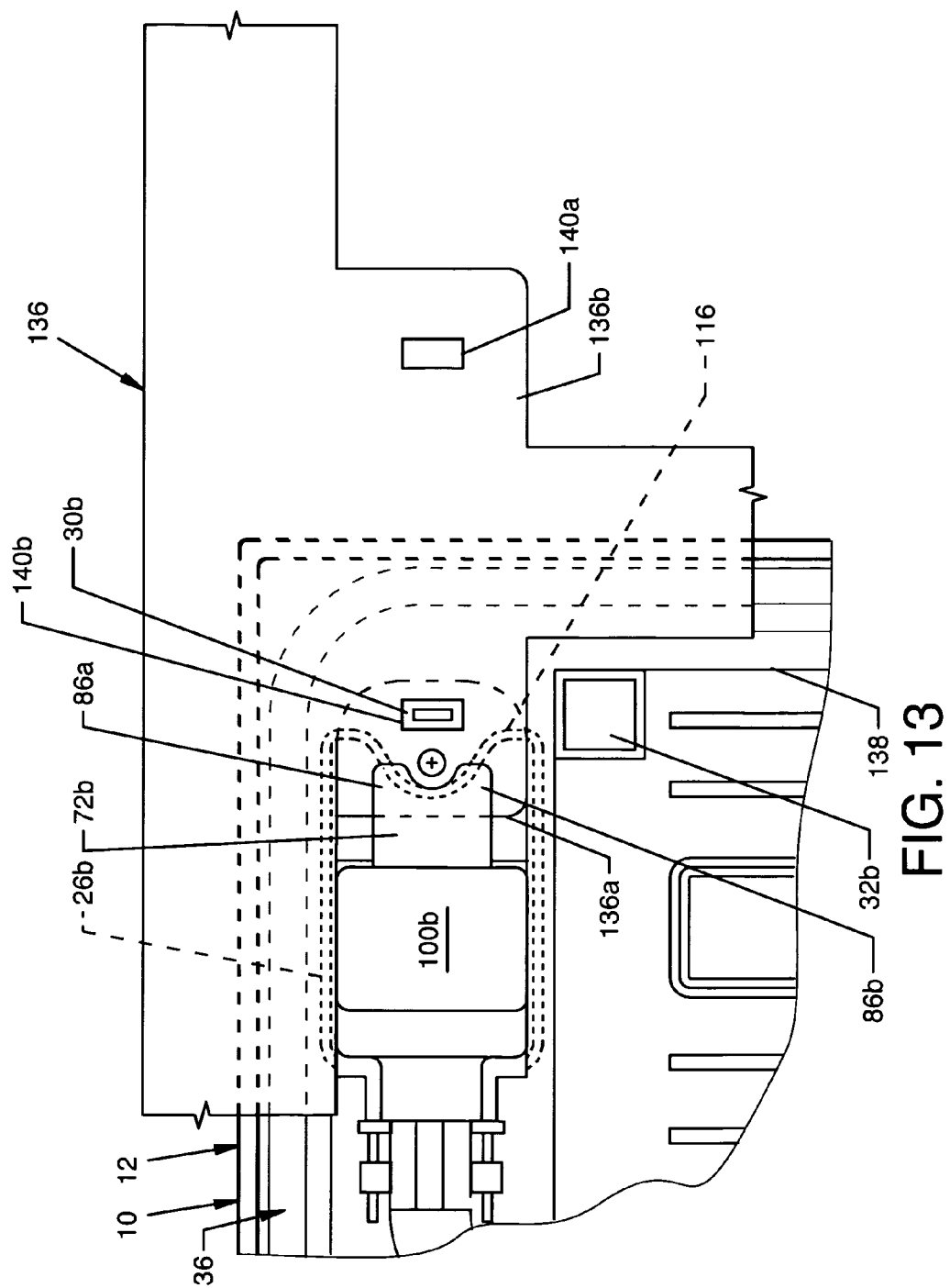
FIG. 13 is rear view showing a latch engaging a corner extension of an electronic sign mounting panel.

FIGS. 9, 10, 11 and 12 illustrate the process of incorporating the multiple seal electronic display module having displacement springs 10 into an electronic sign mounting panel 136, where FIG. 9 is a view of the housing 12 and the electronic sign mounting panel 136 showing a portion thereof in cross section similar to FIG. 8 but showing the components fully assembled, and where FIGS. 10, 11 and 12 are views closely related to FIG. 9 showing, in sequence, the various stages of the process involving attachment of the housing 12, i.e., the invention and associated parts, to a portion of the electronic sign mounting panel 136 such as shown in FIG. 13. FIG. 13 is a plan view showing the latch arms 86*a* and 86*b* of the latch 72*b* engaged over and about the corner extension tab 136*b* of the electronic sign mounting panel 136. Although operation of one of the latches 72*b* wherein reference may be made to more than one latch or component of the latch assembly 22 is described in detail, such as illustrated by the latch 72*b*, operation of the opposite latch 72*a* of the latch assembly 22 and the operation of the latch 72*a* and the latch 72*b* of the latch assembly 24 is the same as described for the latch 72*b*.

The process shown in FIGS. 9, 10, 11, 12 and 13 involving the attachment of the electronic display module 10 to the electronic sign mounting panel 136 is best understood by first perusing the simple installation process where the process includes the steps of 1. rotating the actuator gear 74 to ensure full retraction of the latches 72*a* and 72*b* inwardly towards the actuator gear 74;
2. positioning and aligning the locator posts 30*a*-30*b* of the housing 12 within the appropriate alignment holes 140*a*-140*b* of the electronic sign mounting panel 136 and positioning the main housing 12, i.e., the invention, to bring the curved spring segments 116 of the displacement springs 26*a* and 26*b* into intimate contact with the front surface of the electronic sign mounting panel 136;
3. rotating the actuator gear 74 to position the actuator arms 70*a* and 70*b* outwardly and, as shown in FIG. 11, to position the latch arms 86*a* and 86*b* of the latch 72*b* over the corner extension tab 136*a* of the electronic sign mounting panel 136;
4. continuing the rotation of the actuator gear 74 to rotationally position the latch arms 86*a* and 86*b* of the latch 72b outwardly in order to cause compression of the curved spring segments 116 of the displacement spring 26b against the corner extension tab 136b of the electronic sign mounting panel assembly 136; and, 5. continuing the rotation of the actuator gear 74 to fully position the over center linkage bar 84 over center in order to ensure compression and stability of the curved spring segments 116 of the displacement spring 26b against the corner extension tab 136b of the electronic sign mounting panel 136.

FIG. 9 is an assembled view in partial cross section of the electronic display module 10 engaging, but not secured to, the electronic sign mounting panel 136 in order to form part of the structure of an electronic sign. Shown in particular is the compression of the displacement spring 26a when the electronic display module 10 is first aligned and forcibly positioned about the large opening 138 of and against the front surface of the electronic sign mounting panel 136, whereby many components of the electronic display module 10 extend through the large opening 138 or other openings in the mounting panel 136. The compression and use of the displacement spring 26b is the same as that described with reference to the displacement spring 26a, as now described. Prior to alignment of the electronic display module 10 with the electronic sign mounting panel 136, the actuator arms 70a and 70b of the latch assembly 22 (and 24) are actuated inwardly as shown to the withdrawn position in order to cause the majority of the structure of the latches 72a and 72b to retract into the end latch housings 100a and 100b, respectively, to provide for a clear space between the electronic sign mounting panel 136 and the base 92 of the latch housing 68. The electronic display module 10 is subsequently and forcibly maneuvered into intimate contact with the features of the electronic sign mounting panel 136 where such contact is illustrated to cause contact of a portion of the surrounding edge, i.e., the front surface of the electronic sign mounting panel 136 with, but not limited to, a forced contact with at least the curved spring segment 116 of the displacement spring 26a. Forced contact of the electronic sign mounting panel 136 with the displacement springs 26a (and 26b) causes loading of the displacement springs 26a and 26b and causes the curved spring segment 116 of the displacement springs 26a and 26b to intimately contact the base 92 of the latch housing 68. Forcible positioning of the electronic display module 10 can be accomplished first as shown and thence the position of the electronic display module 10 can subsequently be locked into position by actuation of the latch assembly 22, whereby the latches 72a and 72b are repositioned to the locking position as described later in detail.

FIG. 10 is an assembled view in partial cross section of the electronic display module 10 engaging and secured to the electronic sign mounting panel 136 in order to form part of the structure for an electronic sign. Subsequent to the alignment of the electronic display module 10 with the electronic sign mounting panel 136 as shown in FIG. 9, the actuator arms 70a and 70b of the latch assembly 22 (and 24) are forcibly actuated to the extended position in order to cause the latches 72a and 72b to be repositioned with respect to the end latch housings 100a and 100b. During such repositioning, the pivot posts 88a and 88b of the latches 72a and 72b are repositioned along and within the track recesses 102a and 102b (FIGS. 4, 5 and 6) in each of the end latch housings 100a and 100b and the latches 72a and 72b are pivotally realigned and are extended partially and significantly through the open ends 99 of the end latch housings 100a and 100b, respectively. During such forcible outward repositioning and pivoting, the ends of the latch arms 86a and 86b of the latches 72a and 72b are also brought into intimate pressured contact with the planar portion of the edge of the electronic sign mounting panel 136 surrounding the large opening 138. The relationship of the actuator arms 70b, the over center linkage bars 84, the latch 72b and associated components are further described with reference to FIGS. 11 and 12. Engagement of all of the latches 72a-72b in the latch assemblies 22 and 24 as previously described secures the electronic display 10 to the electronic sign mounting panel 136.

FIG. 11 is an assembled view in partial cross section and partial cutaway of the electronic display module 10 engaging, but not secured to, the electronic sign mounting panel 136 showing the relationship of one of the actuator arms 70b, the over center linkage bar 84, and the latch 72b and associated components. FIG. 12 is an assembled view in partial cross section and in partial cutaway of the electronic display module 10 engaged with and secured to the electronic sign mounting panel 136 showing the relationship of one of the actuator arms 70b, the over center linkage bar 84, and the latch 72b and associated components. With reference to FIGS. 11 and 12, the relationship of one of the actuator arms 70b, the over center linkage bar 84, and the latch 72b is further described. Subsequent to the placement and intimate engagement of the electronic display module 10 to the electronic sign mounting panel 136, the actuator arms 70a and 70b are actuated outwardly. As shown in FIG. 11 and with respect to the actuator arm 70b, the over center linkage bar 84 transfers outwardly directed linear motion of the actuator arm 70b to the latch 72b. The orientation of the over center linkage bar 84 is first controlled and restricted by contact with the latch housing 68 generally within the region referred to as the intermediate latch housing 98b, such as shown in FIG. 11, and as such, the orientation of the latch 72b is maintained in the nonclamping retracted position as shown. As shown in FIG. 12, further outward actuation of the actuator arm 70b permits reorienting and over center positioning of the over center linkage bar 84 to forcibly and rotatingly position the latch 72b outwardly to the clamping position as shown. In the clamping position, the over center linkage bar 84 is rotatingly reoriented and restrictingly influenced by direct contact with the plurality of ramps 106, whereby the latch 72b is forcibly and pivotally allowed to rotate about the pivot posts 88a and 88b within the track recesses 102a and 102b of the end latch housing 100b (FIG. 6) in order to cause the outboard ends of the latch 72b to forcibly and intimately engage the electronic sign mounting panel 136. More specifically, the latch 72b forcibly and intimately engages and contacts a corner extension tab 136b of the electronic sign mounting panel 136, as shown in FIG. 29.

FIG. 13 is a rear view showing a latch 72b engaging a corner extension 136a of the electronic sign mounting panel 136 and also shows the displacement spring 26b under compression by the mating of the electronic display module to the electronic sign panel 136.

FIG. 14 is an exploded view in partial cross section along lines 14-14 of FIG. 9 excluding the electronic sign mounting panel 136 and showing the sealing structure along and about the front, edge and rear of the electronic display module 10. The front edge seal 18 can be made of flexible silicone rubber or other suitable material which can suitably conform to any mating surface, groove or other shaped feature. The front edge seal 18 is in the general shape of a continuous open rectangle as seen in FIG. 2, including a forwardly located planar surface 156, a forwardly located recess 158 adjoining the planar surface 156, a rearwardly located outer lip 160, a rearwardly located inner lip 162, and a rear groove 164 located between the outer lip 160 and the inner lip 162. A nonflexible sealing lip 166 corresponding in general to the shape of the groove 164 of the front edge seal 18 extends forwardly from the front surface of the housing 12.

With respect to the housing 12, the generally rectangular shaped channel 34 extends rearwardly from near the edge of and from the rear of the housing 12 and includes an outer lip 168, an inner lip 170, and a rear groove 172 located between the outer lip 168 and the inner lip 170. The resilient rear seal 36 includes a base 174 which is accommodated by and suitably secured by an adhesive or by any other suitable method within the groove 172 of the housing 12. Preferably, the rear edge seal 36 can be molded in place within the channel 34. The rear edge seal 36 also includes an arcuate edge 176 which when properly engaged with the electronic sign mounting panel 136 intimately and deformingly seals against and along the front surface of the electronic sign mounting panel 136, as shown in FIG. 9.

Figure 15:
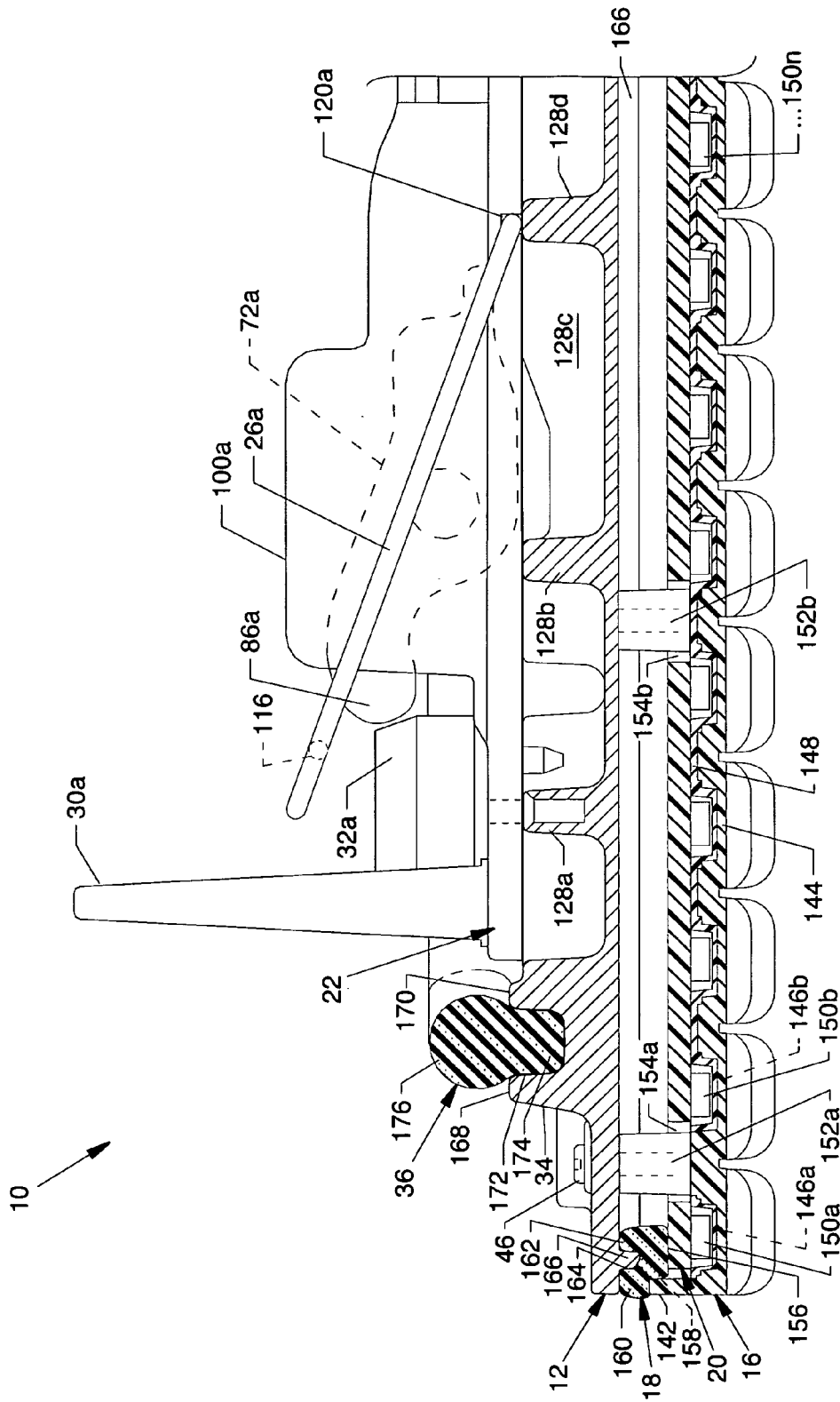
FIG. 15 is an assembled view of the component sections of FIG. 14.

FIG. 15 is an assembled view of the component sections of FIG. 14. Shown in particular are the sealing functions of the front edge seal 18 which mates with and seals against other components of the invention. The use of screw fasteners 46 extend through the housing 12 and into the alignment/mounting posts 152a-152n of the louver panel 16 to forcibly exert pressure therebetween and to cause a synergistic compression of the front edge seal 18 which is aligned in between the housing 12 and the lower panel 16 to ensure a suitable watertight and dustproof seal. The geometric configuration of the front edge seal 18 provides for mating and sealing functions against multiple components and features of the invention in several ways.

One sealing function provides for a seal, i.e., a sealing barrier between the louver panel 16 and the housing 12. More specifically, the rear surface of the continuous lip 142 of the louver panel 16 aligns with and seals against the recess 158 of the front edge seal 18 and the rearward facing portion of the outer lip 160 of the front edge seal 18 aligns with and seals against the forward facing surface of the housing 12 adjacent to and outwardly from the sealing lip 166. Such a sealing configuration provides for an exterior peripheral sealing between the edges of the louver panel 16 and the housing 12.

Another sealing function and yet another sealing barrier is provided by a seal between the circuit board 20 and the housing 12. More specifically, the rear surface of the circuit board 20 is aligned with and sealed to the forward planar surface 156 of the front edge seal 18. On the rear side of the front edge seal 18, a groove 164 therein intimately engages, aligns with and seals against the sealing lip 166 of the housing 12 and on the rear side of the front edge seal 18 and in a cooperating effort, the outer lip 160 and the inner lip 162 intimately engages, aligns with and seals against the front surface of the housing 12 near and about the sealing lip 166. Such a sealing configuration provides for an interior peripheral sealing of the edges of the circuit board 20 and the housing 12.

Still another sealing function is provided at the rear of the louver panel 16, whereby the transparent and clear overmold 148 provides a seal along the rear surface of the louver panel 16, a substrate, and spanning the viewing windows 146a-146n, through which the LEDs 150a-150n are visible.

Figure 16:
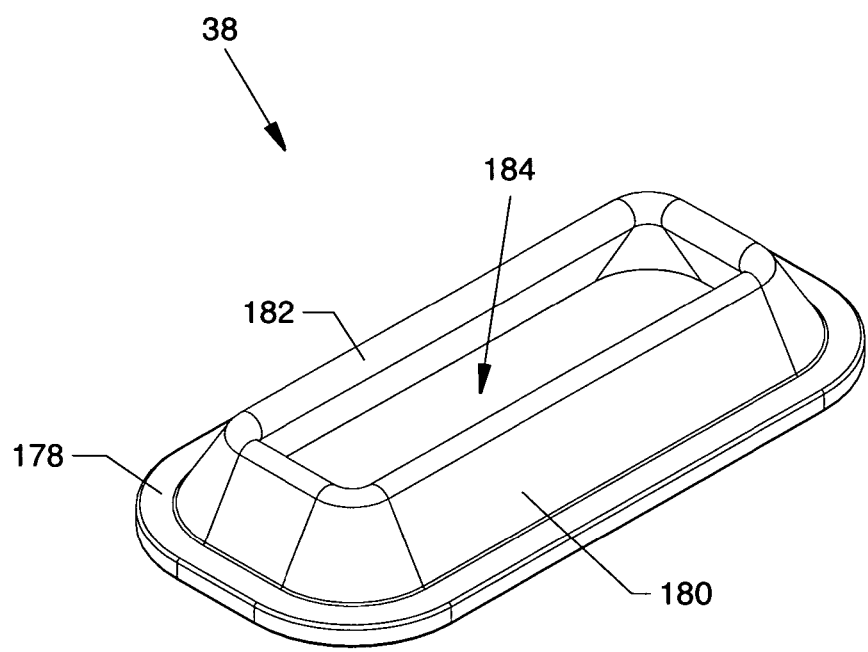
FIG. 16 is an isometric view of the input signal jack base seal.

FIG. 16 is an isometric view of the input signal jack base seal 38 used to seal the input signal jack 52 to prevent the entry of water or debris through the corresponding associated input signal jack opening 60 in the panel 14 and in order to prevent the contamination of the input signal jack 52, the LED circuit board 20 and its associated components, and the louver panel 16. The flexible input signal jack base seal 38 includes a continuous base lip 178 and a continuous wall 180 extending inwardly at an angle from the base lip 178 where the inwardly located end of the wall 180 is a continuous contact surface 182. The space between the contact surface 182 in combination with the space between the continuous wall 180 forms an opening 184 which accommodates the input signal jack 52. The continuous contact surface 182 can generally be rectangular in shape, as is the general overall shape of the input signal jack base seal 38, or the input signal jack base seal 38 can be of other suitable shapes in order to seal against input signal jacks or other jacks of other geometrical shapes. The output signal jack base seal 40 is constructed and used in the same manner as the input signal jack base seal 38.

Figure 17:
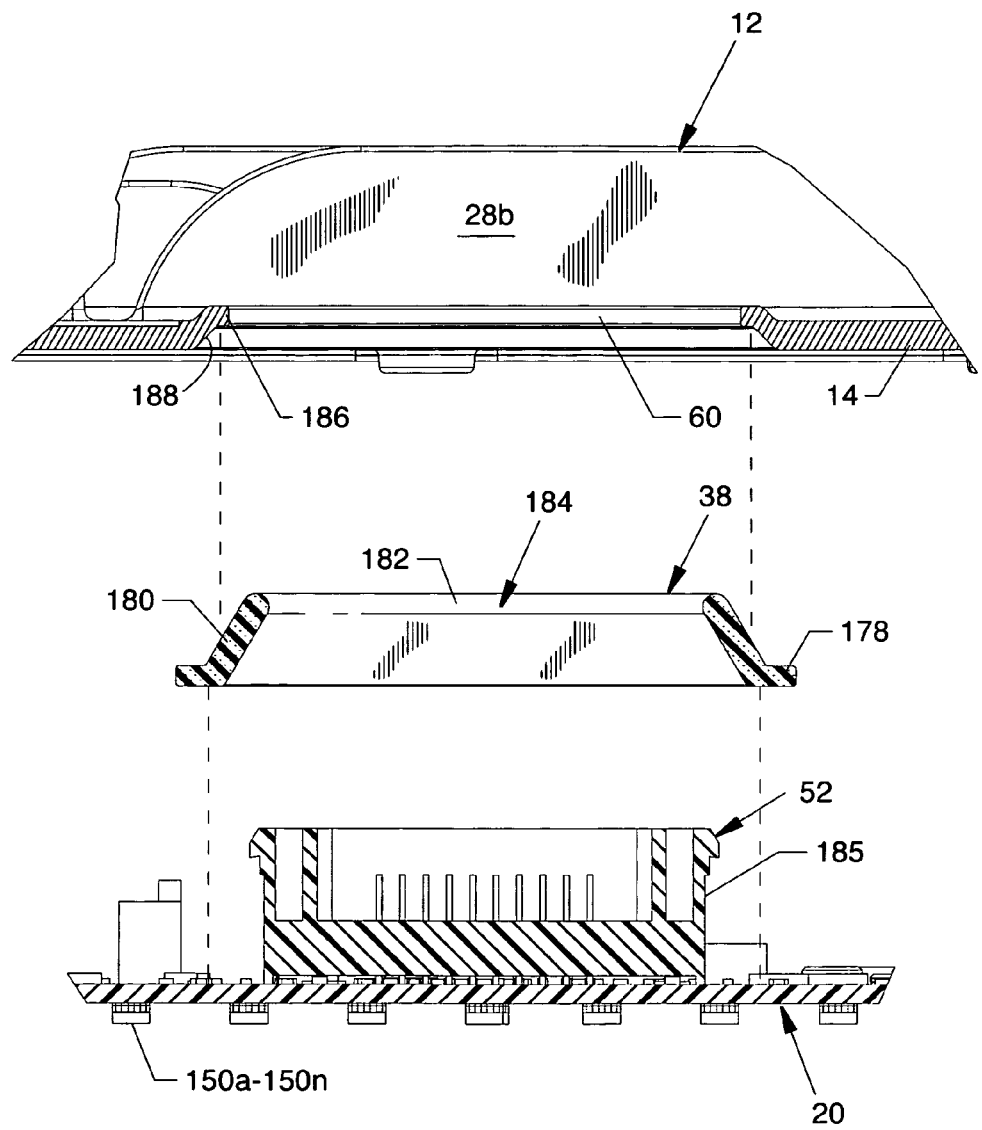
FIGS. 17, 18 and 19 show the aligned relationship of the input signal jack base seal with respect to the housing, the input signal jack and the LED circuit board in different stages of assembly.
Figure 18:
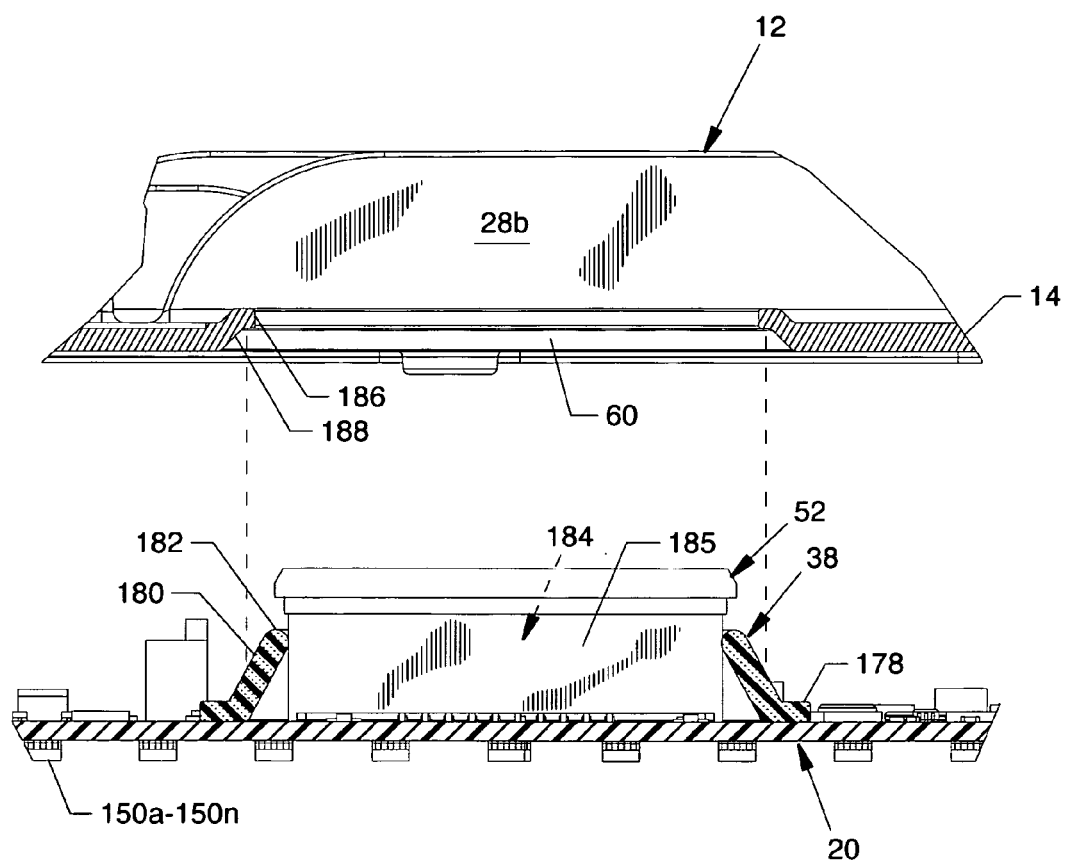
Figure 19:
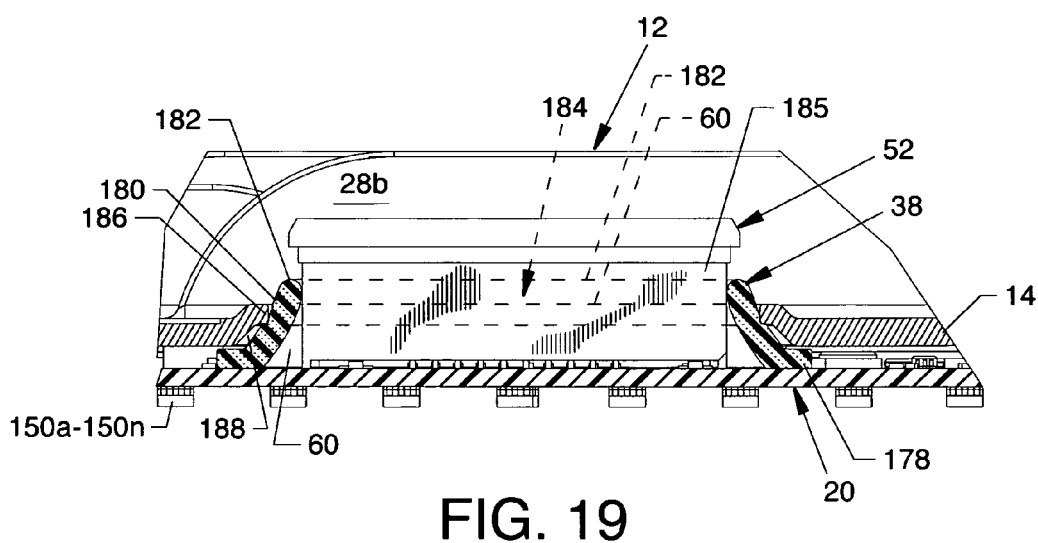

FIGS. 17, 18 and 19 show the aligned relationship of the input signal jack base seal 38 with respect to the housing 12, the input signal jack 52 and the LED circuit board 20 in different stages of assembly.

FIG. 17 is a partially exploded view of the input signal jack base seal 38 shown in cross section, a portion of the housing 12, a portion of the LED circuit board 20 shown in cross section, and the input signal jack 52 shown in cross section, where the input signal jack 52 is suitably secured to the LED circuit board 20. The input signal jack 52 includes at least a four sided outer perimeter base wall 185 suitable for sealing against the contact surface 182 located on the wall 180 of the input signal jack base seal 38, as well as other connector features known in the art. Also shown is the input signal jack opening 60 in the panel 14 of the housing 12 which includes an interior continuous edge 186. The input signal jack opening 60 and the continuous edge 186 are offset rearwardly from the panel 14 of the housing 12. A bevel 188 extends between the continuous edge 186 and the generally planar portion of the panel 14 of the housing 12. Preferably, the rear surface of the LED circuit board 20 immediately surrounding the perimeter of the mounted input signal jack 52 is clear of components in order to present a smooth surface free of protrusions for an interference-free fitting of the base lip 178 of the input signal jack base seal 38 in close proximity to or in contact with the LED circuit board 20.

FIG. 18 shows the input signal jack base seal 38 aligned closely to or in contact with the rear surface of the LED circuit board 20 and also shows the input signal jack base seal 38 aligned about and in intimate contact with the input signal jack 52. The contact surface 182 of the wall 180 intimately contacts the base wall 185 of the input signal jack 52. Such intimate contact of the input signal jack base seal 38 is further and beneficially influenced by its contact with the continuous edge 186 of the housing 12, as shown in FIG. 19.

FIG. 19 shows the input signal jack base seal 38 aligned closely with or in contact with the rear surface of the LED circuit board 20, the input signal jack seal 38 aligned about the input signal jack 52, and the housing 12, a portion of which is shown aligned over and about the input signal jack 52 and aligned over and about and in intimate contact with the input signal jack seal 38. As the housing 12 is brought into forced intimate contact with the LED circuit board 20 by fasteners 46 (FIG. 15), the continuous edge 186 of the input signal jack opening 60 is forcibly positioned against the continuous wall 180 of the input signal jack seal 38 to: (a) forcibly deform and flex the wall 180 toward and against the input signal jack 52, whereby the contact surface 182 establishes and maintains an enhanced and robust seal against the base wall 185 of the input signal jack 52 to prevent entry of liquid and debris along the base wall 185 of the input signal jack 52 and to prevent contamination of the bottom of the input signal jack 52, as well as the LED circuit board 20 and other components, such as, but not limited to, the LEDs 150a-150n; and, (b) to forcibly deform and flex the wall 180 toward and against the input signal jack 52, whereby the contact surface 182 establishes and maintains an enhanced and robust seal extending between the base wall 185 of the input signal jack 52 and the continuous edge 186 of the input signal jack opening 60 to prevent entry of liquid and debris along the continuous edge 186 of the input signal jack opening 60 and the contamination of the LED circuit board 20 and other components such as, but not limited to, the LEDs 150a-150n.

Figure 20:
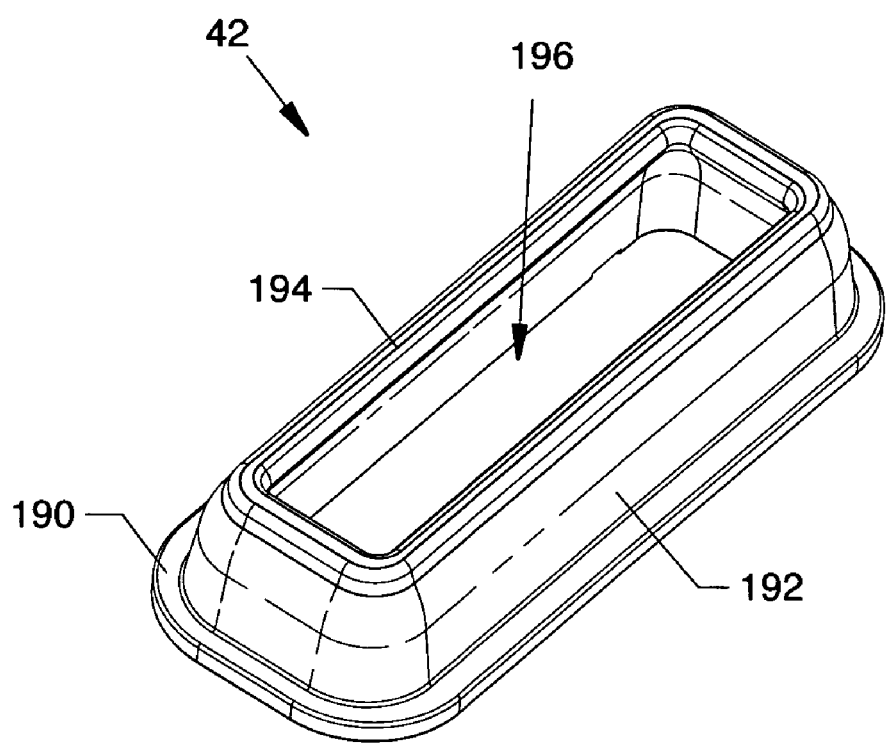
FIG. 20 is an isometric view of a power jack base seal.

FIG. 20 is an isometric view of the power jack base seal 42 used to seal about the power jack 56 to prevent the entry of water or debris through the corresponding associated power jack opening 64 in the panel 14 in order to prevent the contamination of the power jack 56, the LED circuit board 20 and associated components, and the louver panel 16. The flexible power jack base seal 42 includes a continuous base lip 190 and a continuous wall 192 extending upwardly and then inwardly at an angle from the base lip 190 where the inwardly located end of the wall 192 is a continuous contact surface 194. The space within the contact surface 194 in combination with the space within the continuous wall 192 forms an opening 196 which accommodates the power jack 56. The continuous contact surface 194 can generally be rectangular in shape as is the general overall shape of the power jack base seal 42, or the power jack base seal 42 can be of other suitable shapes in order to provide a seal for the power jack 56 or other jacks of other geometrical shapes.

Figure 21:
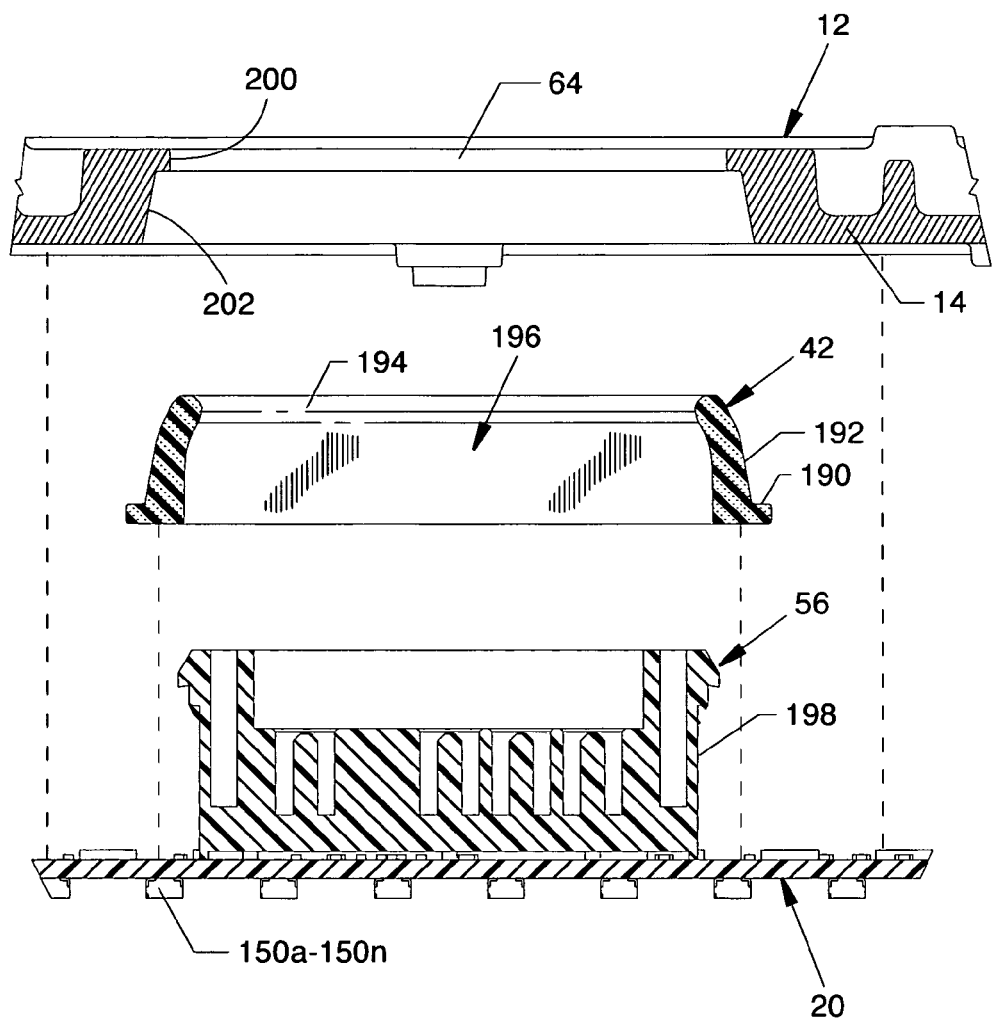
FIGS. 21, 22 and 23 show the aligned relationship of the power jack base seal with respect to the housing, the power jack and the LED circuit board in different stages of assembly.
Figure 22:
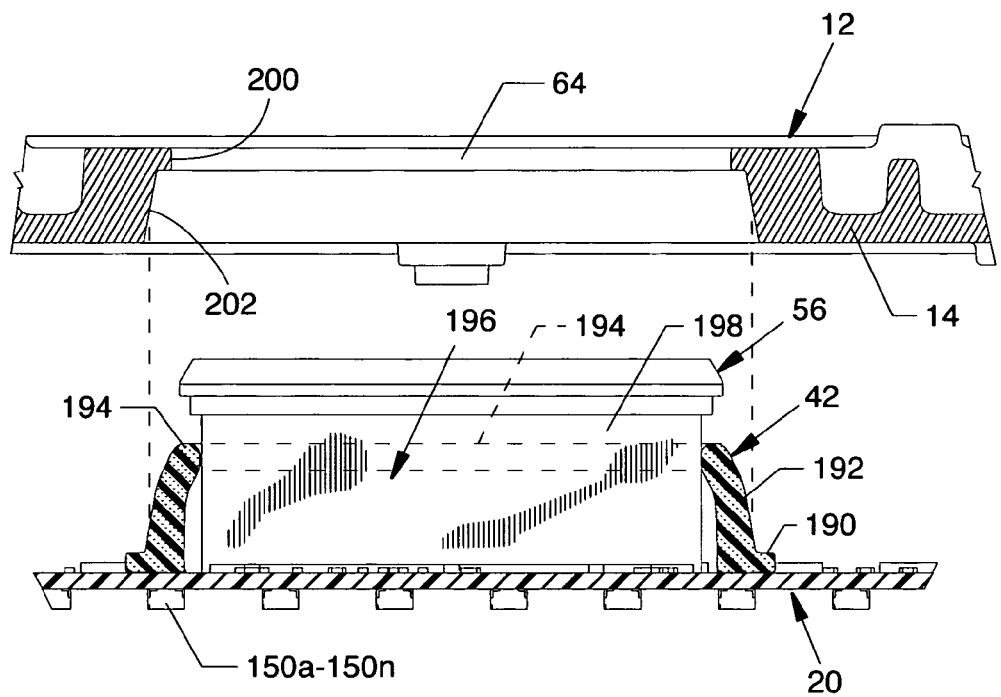
Figure 23:
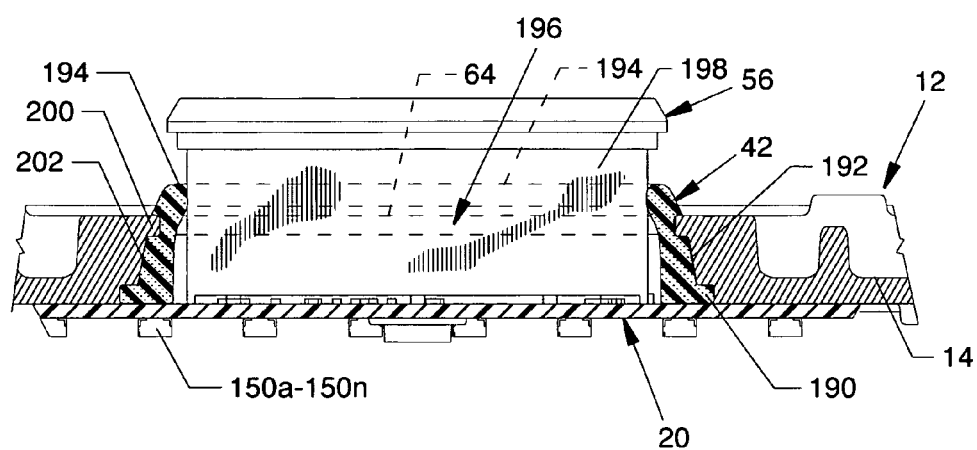

FIGS. 21, 22 and 23 show the aligned relationship of the power jack base seal 42 with respect to the housing 12, the power jack 56 and the LED circuit board 20 in different stages of assembly.

FIG. 21 is a partially exploded view of the power jack base seal 42 shown in cross section, the housing 12, a portion of which is shown in cross section, the LED circuit board 20, a portion of which is shown in cross section, and the power jack 56 shown in cross section, where the power jack 56 is suitably secured to the LED circuit board 20. The power jack 56 includes at least a four sided outer perimeter base wall 198 suitable for sealing with the contact surface 194 located on the wall 192 of the power jack base seal 42, as well as other connector features known in the art. Also shown is the power jack opening 64 in the panel 14 of the housing 12 which includes an interior continuous edge 200. The power jack opening 64 and the continuous edge 200 are offset rearwardly from the panel 14 of the housing 12. A bevel 202 extends between the interior continuous edge 200 and the generally planar portion of the panel 14 of the housing 12. Preferably, the rear surface of the LED circuit board 20 immediately surrounding the perimeter of the power jack 56 is clear of components in order to present a smooth surface free of protrusions for an interference-free fitting of the base lip 190 of the power jack base seal 42 in close proximity to or in contact with the LED circuit board 20.

FIG. 22 shows the power jack base seal 42 is close alignment with or in intimate contact with the rear surface of the LED circuit board 20 and also shows the power jack base seal 42 aligned about and in intimate contact with the power jack 56. The contact surface 194 of the wall 192 intimately contacts the base wall 192 of the power jack 56. Such an intimate contact of the power jack 56 is further and beneficially influenced by its contact with the continuous edge 200 of the housing 12, as shown in FIG. 23.

FIG. 23 shows the power jack base seal 42 aligned closely with or in intimate contact with the rear surface of the LED circuit board 20, the power jack base seal 42 aligned about the power jack 56, and the housing 12, a portion of which is shown aligned over and about the power jack 56 and aligned over and about and in intimate contact with the power jack base seal 42. As the housing 12 is brought into forced intimate contact with the LED circuit board 20 by fasteners 46 (FIG. 15), the continuous edge 200 of the power jack opening 64 is forcibly positioned against the continuous wall 192 of the power jack seal 42 to: (a) forcibly deform and flex the continuous wall 192 toward and against the power jack 56, whereby the contact surface 194 establishes and maintains an enhanced and robust seal against the base wall 198 of the power jack 56 to prevent entry of liquid and debris along the base wall 198 of the power jack 56 and to prevent contamination of the bottom of the power jack 56, as well as the LED circuit board 20 and other components such as, but not limited to, the LEDs 150a-150n; and, (b) to forcibly deform and flex the wall 192 toward and against the power jack 56, whereby the contact surface 194 establishes and maintains an enhanced and robust seal extending between the base wall 198 of the power jack 56 and the continuous edge 200 of the power jack opening 64 to prevent entry of liquid and debris along the continuous edge 200 of the power jack opening 64 and the contamination of the LED circuit board 20 and other components such as, but not limited to, the LEDs 150a-150n.

Figure 24:
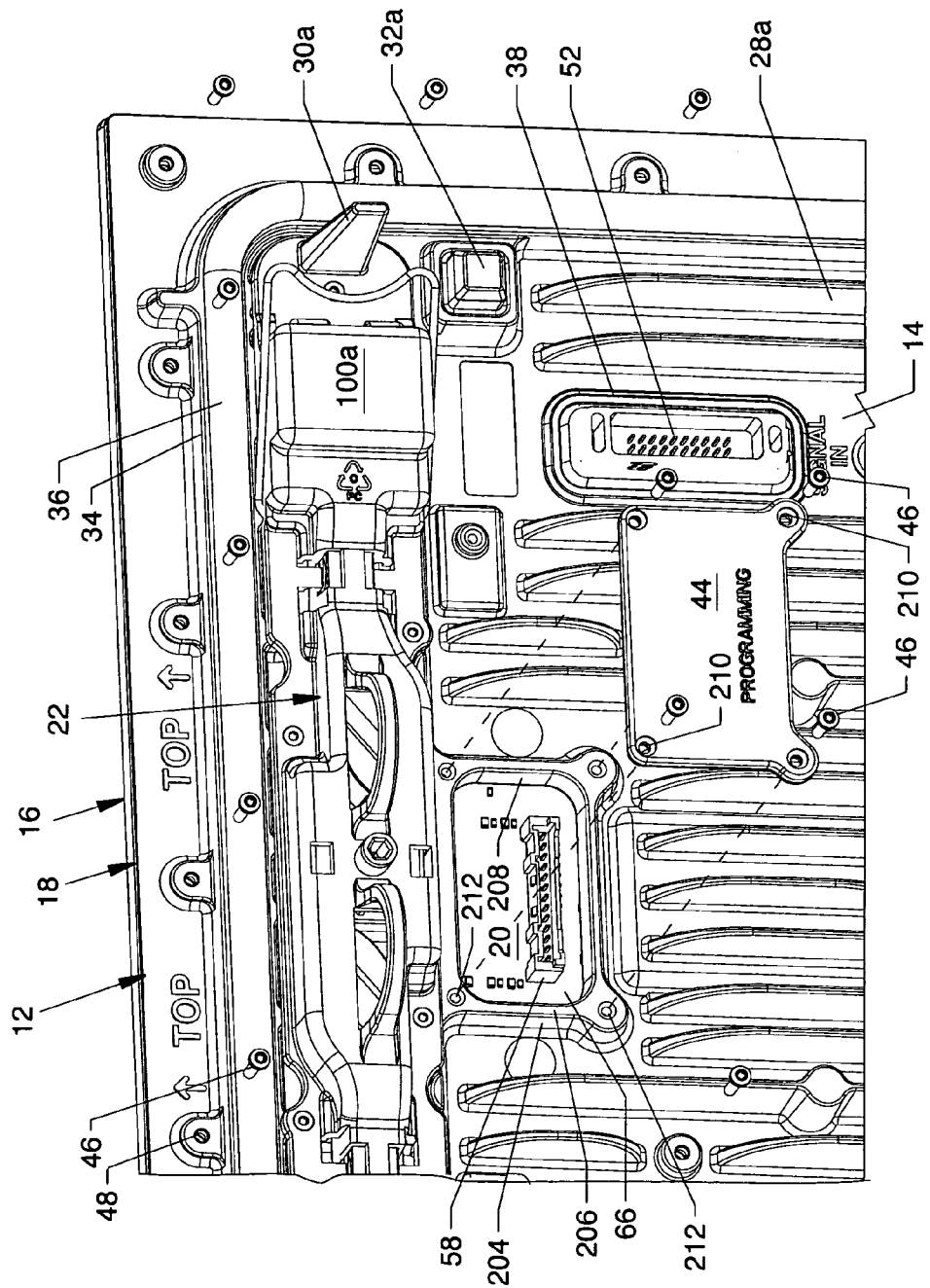
FIG. 24 is a rear view of an upper corner of the invention where the overmolded programming jack seal is removed and offset from the programming jack opening in order to provide access to the programming jack.

FIG. 24 is a rear view of an upper corner of the electronic display module where the overmolded programming jack seal 44 is removed and offset from the programming jack opening 66 in order to provide access to the programming jack 58. Shown in particular is the relationship of the overmolded programming jack seal 44 to the programming jack opening 66 and the programming jack 58 and to a program jack housing 204. The programming jack 58 mounts to the LED circuit board 20 and is accessible through the programming jack opening 66 when the overmolded programming jack seal 44 is removed as shown. The programming jack opening 66 is formed by the continuous four sided program jack housing 204 extending rearwardly from the panel 14 of the housing 12. The program jack housing 204 includes a continuous sealing surface 206 along the rear edge thereof and also includes a continuous sealing surface 208 which is slightly angled extending from the continuous sealing surface 206 to the panel 14 of the housing 12. The sealing surface 206 and the sealing surface 208 seal against features of the overmolded programming jack seal 44, as described later in detail. A plurality of fasteners 46 extend through holes 210 at the corners of the overmolded programming jack seal 44 and into a plurality of holes 212 in the program jack housing 204 to sealingly attach the overmolded programming jack seal 44 to the program jack housing 204.

Figure 25:
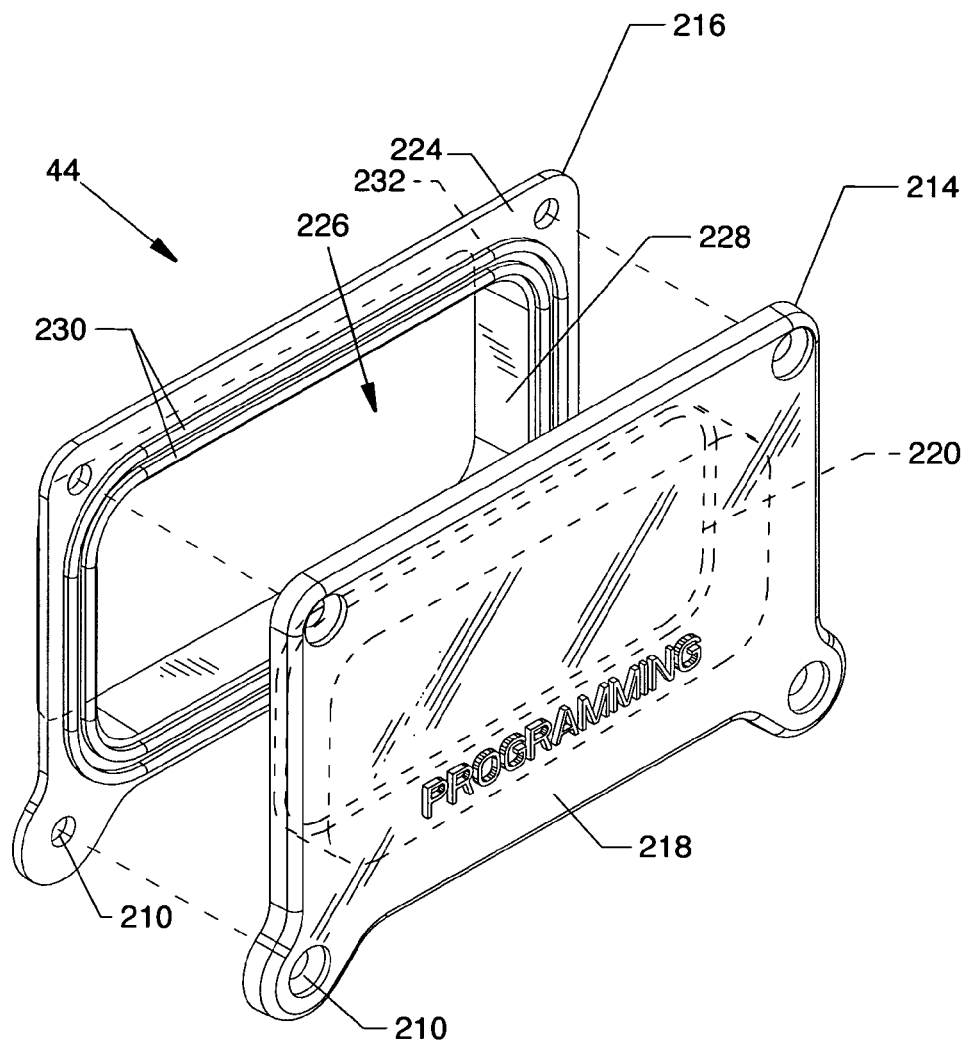
FIG. 25 is an exploded rear view of the overmolded programming jack seal formed by a geometrically configured substrate component and a geometrically configured overmold component.
Figure 26:
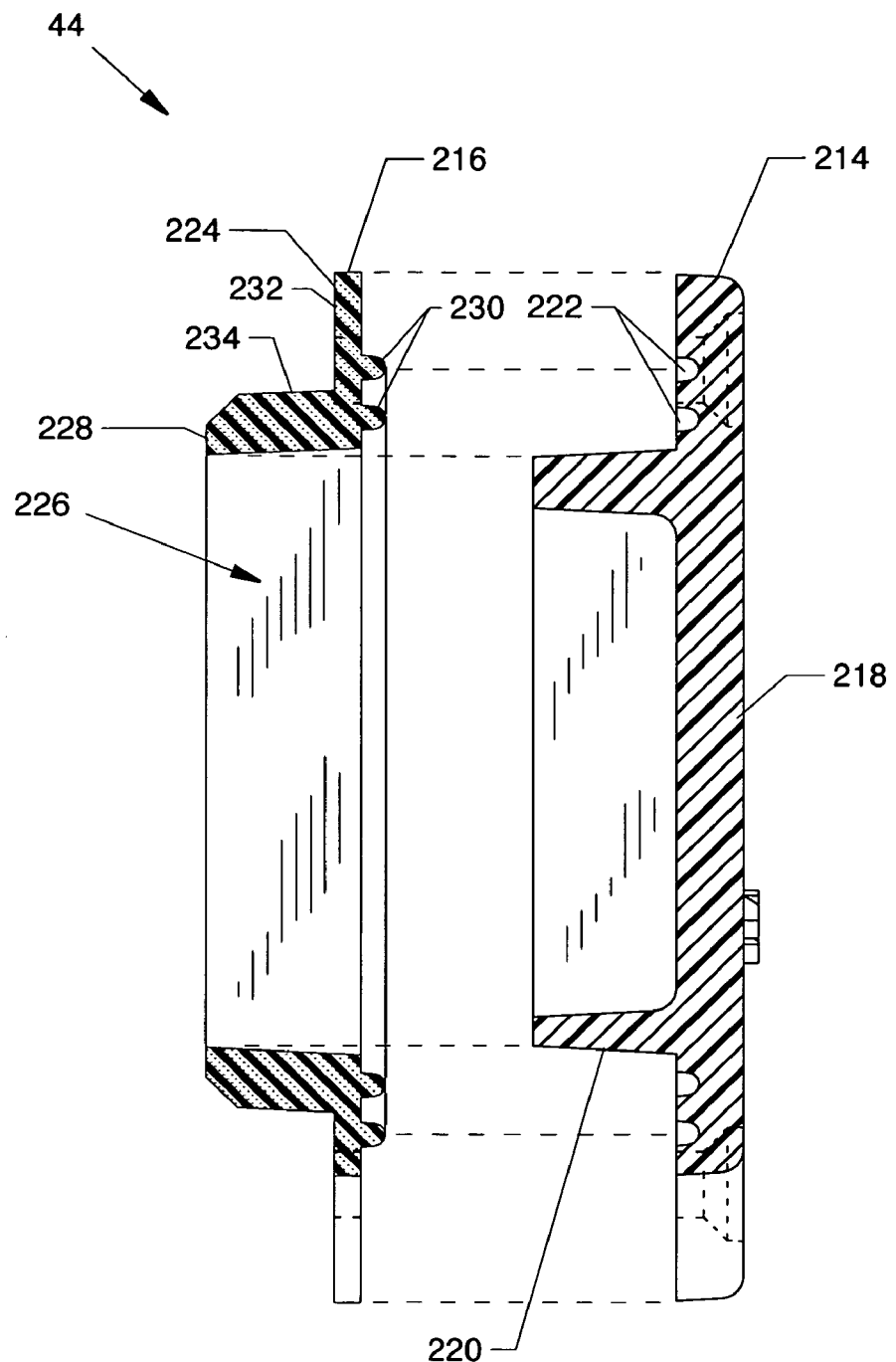
FIG. 26 is an exploded cross section view of the overmolded programming jack seal formed by the geometrically configured substrate component and the geometrically configured overmold component.

FIG. 25 is an exploded rear view of the overmolded programming jack seal 44 formed by a geometrically configured substrate component 214 and a geometrically configured overmold component 216. FIG. 26 is an exploded cross section view of the overmolded programming jack seal 44 formed by the geometrically configured substrate component 214 and by the geometrically configured overmold component 216. With reference to FIGS. 25 and 26, the overmolded programming jack seal 44 is further described. The substrate component 214, which preferably can be clear, includes a panel 218 and a lip 220 which continuously extends forwardly from the front surface of the panel 218. The substrate component 214 also includes a plurality of concentric continuous grooves 222 within the front surface of the panel 218 corresponding in shape to the substantially rectangular shape of a plurality of concentric continuous protrusions 230 shown with reference to the features of the overmold component 216. The overmold component 216, which is complementary to the substrate component 214, includes a panel 224 and a rectangular shaped opening 226 located central to the panel 224 bounded by a lip 228 which is continuous and which extends forwardly from the front surface of the panel 224. The panel 224 includes a sealing surface 232 located on the front surface thereof. Additionally, an outer peripheral sealing surface 234 is included on the lip 228 and is angled slightly in order to intimately and sealingly engage the slightly angled sealing surface 208 of the program jack housing 204. The plurality of protrusions 230 extending rearwardly from the rear surface of the panel 224 are aligned with the corresponding grooves 222 of the substrate component 214. The process of overmolding is accomplished by methods known in the art to form, bond and attachingly assemble the components of the overmolded programming jack seal 44, whereby the overmolded programming jack seal 44 results in a single unitary device. The softer and more flexible attributes of the overmold component 216 embodied in the overmolded programming jack seal 44 allow for a suitable sealing of the overmolded programming jack seal 44 to the sealing surface 206 surrounding the programming jack opening 66 and to the sealing surface 208 extending between the sealing surface 206 and the panel 14 of the housing 12, as later described in detail.

Figure 27:
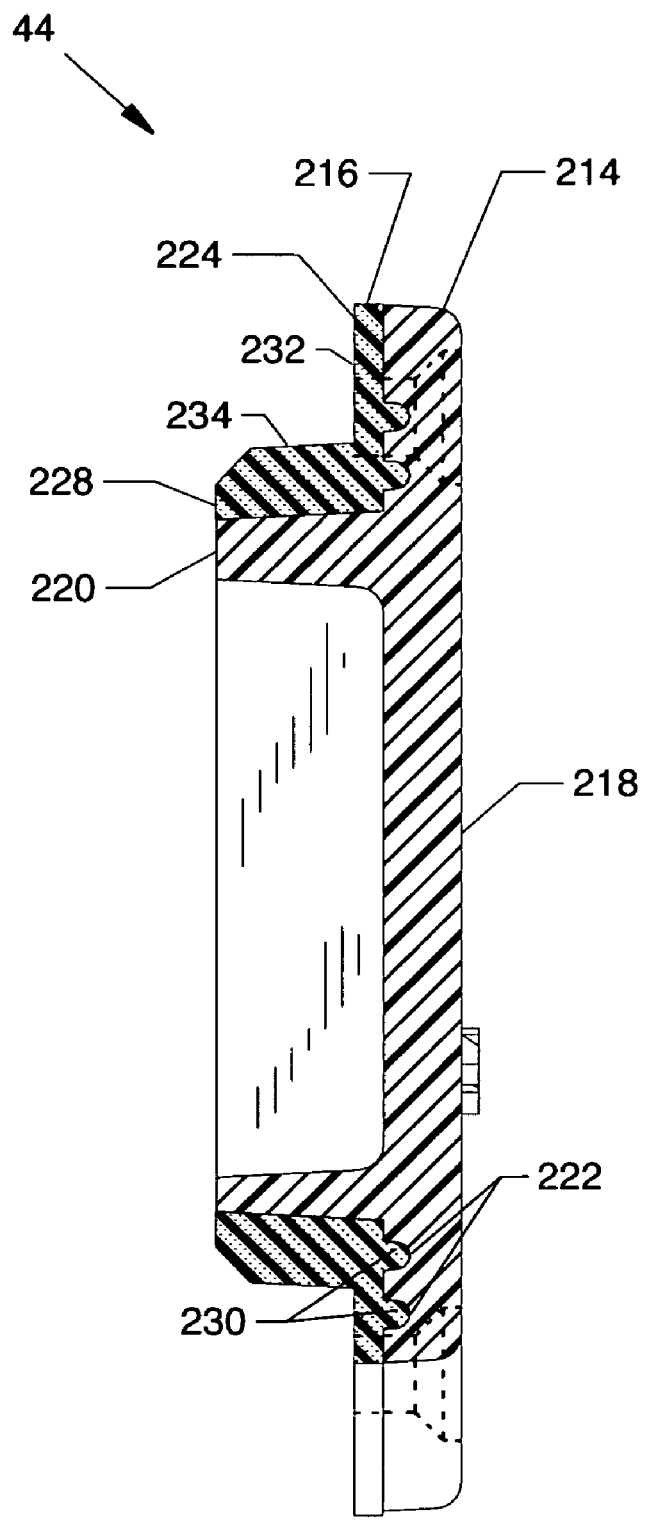
FIG. 27 is a cross section view of the overmolded programming jack seal formed by the geometrically configured substrate component and the geometrically configured overmold component.

FIG. 27 is a cross section view of the overmolded programming jack seal 44 formed by the geometrically configured substrate component 214 and the geometrically configured overmold component 216. In the overmolding process, various features and components of the substrate component 214 and the overmold component 216 are formed, bonded and attachingly assembled where an outer portion of the front surface of the panel 218 and the rear surface of the panel 224 of the overmold component 216 are joined, the protrusions 230 of the overmold component 216 and the grooves 222 of the substrate component 214 are joined, and the peripheral outer surface of lip 220 of the substrate component 214 is joined to the inner periphery of lip 228 of the overmold component 216.

Figure 28:
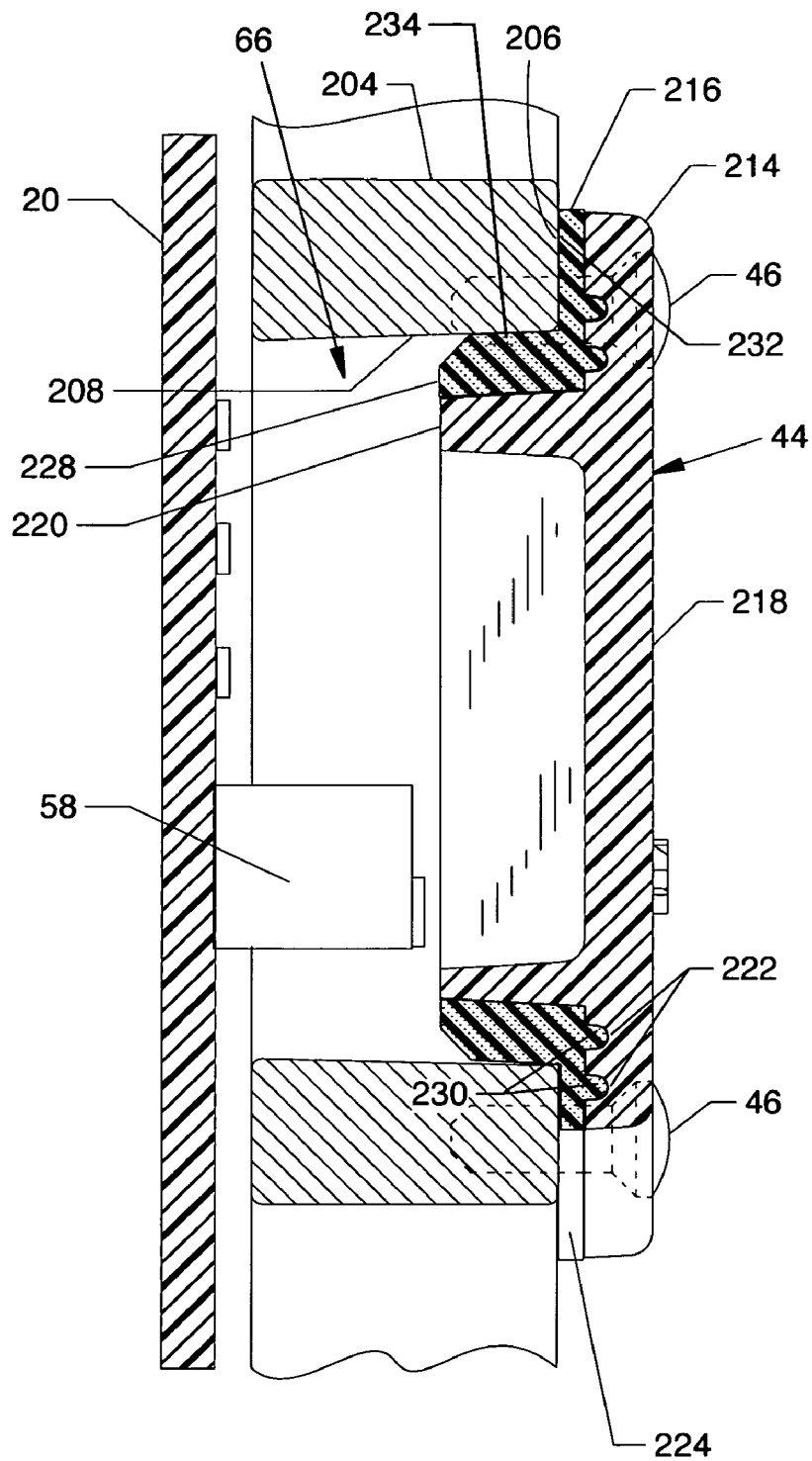
FIG. 28 is a cross section view of the overmolded programming jack seal aligned to and secured over and about the programming jack opening; and, FIG. 29 illustrates the alignment and/or the use of several electronic display modules with an electronic sign mounting panel.

FIG. 28 is a cross section view of the overmolded programming jack seal 44 aligned with and secured over and about the programming jack opening 66 in order to provide a seal against water, debris and the like from entering through the programming jack opening 66 and in order to protect the programming jack 58 and the LED circuit board 20 and the components directly associated therewith. For purposes of brevity and clarity, the louver panel 16 is not shown in FIG. 28. Shown in particular is the interfacing of the features of the overmolded programming jack seal 44 to the features of the programming jack opening 66. A suitable seal is provided in several ways. One seal is provided between the sealing surface 232 located on the panel 224 of the overmold component 216 and the sealing surface 206 of the program jack housing 204. Another seal is provided between the outer peripheral sealing surface 234 of the lip 228 and the sealing surface 208 of the program jack housing 204. Generally, fasteners 46 are used to secure the overmolded programming jack seal 44 over and about the programming jack opening 66, but more particularly are used to provide a compression fit therewith. More specifically, force is provided by fasteners 46 to ensure a suitable compression sealing between the sealing surface 232 located on the panel 224 of the overmold component 216 and the sealing surface 206 of the program jack housing 204. Force is provided by fasteners 46 to ensure a suitable compression in plug-like fashion and thus provide a sealing between the slightly angled sealing surface 234 of the lip 228 with the slightly angled sealing surface 208 of the program jack housing 204.

FIG. 29 illustrates the alignment and use of several electronic display modules 10 with an electronic sign mounting panel 136. One electronic display module 10 is shown aligned with and secured within a large opening 138. The plurality of locator posts 30a-30d is aligned within the alignment holes 140a-140n and the plurality of locator posts 32a-32d is aligned with the junction of the vertical edges of a large opening 138 and with the top or bottom edge of the corner extension tabs 136a-136n in order to offer an additional alignment with the electronic sign mounting panel 136.

Various modifications can be made to the present invention without departing from the apparent scope thereof.

Multiple Seal Electronic Display Module Having Displacement Springs

PARTS LIST

| | |
|---|---|
| 10 | multiple seal electronic display module having displacement springs |
| 12 | housing |
| 14 | panel |
| 16 | louver panel |
| 18 | front edge seal |
| 20 | LED circuit board |
| 22 | latch assembly |
| 24 | latch assembly |
| 26a-d | displacement springs |
| 28a-n | heat dissipation fins |
| 30a-d | locater posts |
| 32a-d | locater posts |
| 33 | base |
| 34 | channel |
| 36 | rear edge seal |
| 37a-n | keying features |
| 38 | input signal jack base seal |
| 40 | output signal jack base seal |
| 42 | power jack base seal |
| 44 | overmolded programming jack seal |
| 46 | fasteners |
| 48 | pads |
| 50 | alignment posts |
| 52 | input signal jack |
| 54 | output signal jack |
| 56 | power jack |
| 58 | programming jack |
| 60 | input signal jack opening |
| 62 | output signal jack opening |
| 64 | power jack opening |
| 66 | programming jack opening |
| 68 | latch housing |
| 70a-b | actuator arms |
| 72a-b | latches |
| 74 | actuator gear |
| 76 | shaft |
| 75 | O-ring seal |
| 78 | hex hole |
| 80 | toothed rack |
| 84 | over center linkage bar |
| 86a-b | latch arm |
| 88a-b | pivot post |
| 90 | slide surface |
| 92 | base |
| 94 | alignment pins |
| 95 | holes |
| 96 | central latch housing |
| 98a-b | intermediate latch housings |
| 99 | opening |
| 100a-b | end latch housings |
| 102a-b | track recesses |
| 104 | planar surface |
| 106 | ramps |
| 108 | support hole |
| 110a-b | short spring segments |
| 112a-b | transverse spring segments |
| 114a-b | long spring segments |
| 116 | curved spring segment |
| 118a | upper mounting recess |
| 118b | lower mounting recess |

-continued

| | |
|---|---|
| 120a-b | notches |
| 122a-b | spring clasps |
| 124a-b | actuator arm clasps |
| 126a-b | actuator arm clasps |
| 128a-n | short support panels |
| 129 | holes |
| 130 | elongated support panel |
| 131 | pad bases |
| 132 | tabs |
| 134 | support hole |
| 136 | electronic sign mounting panel |
| 136a-n | corner extension tabs |
| 138 | large opening |
| 140a-n | alignment holes |
| 142 | continuous lip |
| 144 | grid panel |
| 146a-n | viewing windows |
| 148 | overmold |
| 150a-n | LEDs |
| 152a-n | alignment/mounting posts |
| 154a-n | holes |
| 156 | planar surface |
| 158 | recess |
| 160 | outer lip |
| 162 | inner lip |
| 164 | groove |
| 166 | sealing lip |
| 168 | outer lip |
| 170 | inner lip |
| 172 | groove |
| 174 | base |
| 176 | arcuate edge |
| 178 | base lip |
| 180 | wall |
| 182 | contact surface |
| 184 | opening |
| 185 | base wall |
| 186 | continuous edge |
| 188 | bevel |
| 190 | base lip |
| 192 | wall |
| 194 | contact surface |
| 196 | opening |
| 198 | base wall |
| 200 | continuous edge |
| 202 | bevel |
| 204 | program jack housing |
| 206 | sealing surface |
| 208 | sealing surface |
| 210 | holes |
| 212 | holes |
| 214 | substrate component |
| 216 | overmold component |
| 218 | panel |
| 220 | lip |
| 222 | grooves |
| 224 | panel |
| 226 | opening |
| 228 | lip |
| 230 | protrusions |
| 232 | sealing surface |
| 234 | sealing surface |

It is claimed:

1. A latch assembly for an electronic display module comprising an elongated latch housing, said housing having a rear side being substantially closed and an open front side, a support hole in the center of said rear side, an actuator gear secured within said support hole, said actuator gear being substantially cylindrical with spaced teeth attached thereto, a pair of elongated actuator arms supported within said latch housing, each of said actuator arms having a proximal end and a distal end, said proximal end of each of said actuator arms having a toothed rack oppositely spaced from each other and inter-engaged with said teeth of said actuator gear, a movable latch attached at said distal end of each of said actuator arms, each of said movable latches having a pair of spaced arcuate arms, each of said movable latches being positioned substantially within said latch housing, a pair of elongated displacement springs, each of said elongated displacement springs having a pair of parallely spaced segments, each of said pair of spaced segments being fixed within opposite ends of latch housing, each of said pair of displacement springs having a continuous elongated segment attached to each said pair of parallely spaced segments and extending through said rear side of said latch housing and whereby said continuous elongated segment of each of said displacement springs extends at an angle to said rear side of said latch housing.

2. The latch assembly for an electronic display module as in claim 1, wherein said latch housing has an extension at opposite ends thereof with a locator post attached to the rear side of each of said extensions, with a pair of vertically spaced alignment pins attached to the front side of each of said extensions and with a central hole in each of said extensions.

3. The latch assembly for an electronic display module as in claim 2, wherein said substantially cylindrical actuator gear has a hex shaped hole therethrough.

4. The latch assembly for an electronic display module as in claim 3, wherein said electronic display module includes a substantially rectangular housing having a front side and a rear side, a louver panel attached to said front side of said rectangular housing, said louver panel having a front side and a rear side, an LED circuit board supported between said rectangular housing and said louver panel and wherein a latch assembly is secured at the top and bottom of said rear side of said rectangular housing.

5. The latch assembly for an electronic display module as in claim 4, wherein there is a plurality of spaced peripheral mounting posts on said rear side of said louver panel, a plurality of spaced holes in said rectangular housing in alignment with said spaced peripheral mounting posts and a fastener through each of said holes and within each of said mounting posts for securing said rectangular housing, said LED circuit board and said louver panel together.

6. The latch assembly for an electronic display module as in claim 5, wherein there is a continuous peripheral front seal between said front side of said rectangular housing and said rear side of said louver panel, said continuous peripheral front seal being spaced outwardly from said spaced peripheral mounting posts.

7. The latch assembly for an electronic display module as in claim 6, wherein said rear side of said rectangular housing has a plurality of spaced short support panels in alignment with said alignment pins for receiving said alignment pins and a plurality of spaced short support panels in alignment with each of said holes in each of said extensions for receiving a fastener through each of said holes in each of said extensions whereby said top and bottom latch assemblies are secured to said rear side of said rectangular housing.

8. The latch assembly for an electronic display module as in claim 7, wherein said rear side of said substantially rectangular housing has a peripheral groove therein and a continuous peripheral rear seal inserted therein, said peripheral rear seal being externally spaced from said elongated base of said elongated latch housing.

9. The latch assembly for an electronic display module as in claim 8, wherein there is a plurality of electronic display modules attached to a mounting panel for an electronic sign, said mounting panel having a plurality of substantially rectangular openings in which said plurality of electronic display modules is positioned, said mounting panel having an extension tab in each corner of said rectangular openings, each of said extension tabs having an alignment hole therein for receiving said locator posts of said latch housing extensions, said mounting panel of said electronic sign having a front side and a rear side, each of said electronic display modules being supported on said mounting panel by said top and bottom latch assemblies upon actuation of said actuator gear, whereupon said pair of spaced arcuate arms of each said movable latches is clamped to said rear side of a respective extension tab and whereupon said displacement springs are sandwiched between said front side of said mounting panel and said rear side of said elongated latch housing and whereupon said continuous peripheral rear seal is sandwiched between said front side of said mounting panel and said rear side of said rectangular housing.

10. The latch assembly for an electronic display module as in claim 5, wherein said fastener through each of said spaced holes is a screw.

11. The latch assembly for an electronic display module as in claim 7, wherein said fastener through each of said holes is a screw.

12. A latch assembly for an electronic display module comprising an elongated latch housing, said latch housing having a substantially hollow, elongated base with a flat extension at opposite ends thereof, said elongated base having a rear side and a front side, a support hole in the center of said elongated base, an actuator gear secured within said support hole, said actuator gear being substantially cylindrical with spaced teeth attached thereto, a pair of elongated actuator arms supported within said hollow elongated base, each of elongated arms having a proximal end and a distal end, said proximal end of each of said actuator arms having a toothed rack oppositely spaced from each other and inter-engaged with said teeth of said actuator gear, a latch movably attached at said distal end of each of said actuator arms, each of said latches having a pair of spaced arcuate arms, each of said latches being positioned substantially within said hollow elongated base, a pair of elongated displacement springs, each of said elongated displacement springs having a pair of parallely spaced segments, and each of said pair of displacement springs having a continuous elongated segment attached to said pair of parallely spaced segments and extending through said hollow elongated base whereby said continuous elongated segment of each of said displacement springs extends at an angle to said rear side of said elongated base.

13. The latch assembly for an electronic display module as in claim 12, wherein each of said flat extensions has a rear side and a front side with a locator post attached to said rear side of each of said flat extensions and with alignment pins attached to said front side of each of said flat extensions.

14. The latch assembly for an electronic display module as in claim 13, wherein said substantially cylindrical actuator gear has a hex shaped hole therethrough.

15. The latch assembly for an electronic display module as in claim 14, wherein each of said displacement springs has an intermediate segment connected to each of said pair of parallely spaced segments and to said continuous elongated segment wherein said intermediate segments extend through said hollow elongated base and said continuous elongated segment extends at an angle to said rear side of said elongated base.

16. The latch assembly for an electronic display module as in claim 15, wherein said continuous elongated segment extending at an angle to said rear side of said elongated base has a pair of parallely spaced segments joined by a curved segment.

17. A multiple seal electronic display module comprising a substantially rectangular louver panel, said louver panel having a front side and a rear side, a substantially rectangular LED circuit board, a substantially rectangular housing, said rectangular housing having a front side and a rear side, said LED circuit board, and said louver panel being secured together by a plurality of peripheral spaced fasteners, a pair of latch assemblies being attached by fasteners to said top and bottom of said rear side of said rectangular housing, a substantially peripheral front seal sandwiched between said rear side of said louver panel and said front side of said rectangular housing, said substantially peripheral front seal being spaced outside of said plurality of peripheral spaced fasteners, each of said latch assemblies comprising an elongated latch housing, said latch housing having a substantially hollow, elongated base with a flat extension at opposite ends thereof, said elongated base having a rear side and a front side, a support hole in the center of said elongated base and a support hole in the center of said rectangular housing, an actuator gear secured between and within said support holes, said actuator gear being substantially cylindrical with spaced teeth attached thereto, a pair of elongated actuator arms being supported within said hollow elongated base, each of said pair of elongated arms having a proximal end and a distal end, said proximal end of each of said actuator arms having a toothed rack oppositely spaced from each other and inter-engaged with said teeth of said actuator gear, a latch movably attached at said distal end of each of said actuator arms, each of said latches having a pair of spaced arcuate arms, each of said latches being positioned substantially within said hollow elongated base, a pair of elongated displacement springs, each of said elongated displacement springs having a pair of parallely spaced segments supported within said hollow elongated base, and each of said pair of displacement springs having a continuous elongated segment attached to said pair of parallely spaced segments and extending through said hollow elongated base whereby said continuous elongated segment of each of said displacement springs extends at an angle to said rear of said elongated base.

18. The multiple seal electronic display module as in claim 17, wherein each of said flat extensions has a rear side and a front side with a locator post attached to said rear side of each of said flat extensions and with alignment pins attached to said front side of each of said flat extensions.

19. The multiple seal electronic display module as in claim 18, wherein said rear of said rectangular housing has a plurality of short support panels in alignment with said alignment pins of said flat extensions and into which said alignment pins are inserted.

20. The multiple seal electronic display module as in claim 19, wherein said rear side of said rectangular housing has a plurality of spaced short support panels in alignment with said alignment pins for receiving said alignment pins and a plurality of spaced short support panels in alignment with each of said holes in each of said flat extensions for receiving a fastener through each of said holes in each of said extensions whereby said top and bottom latch assemblies are secured to said rear side of said rectangular housing.

21. The multiple seal electronic display module as in claim 20, wherein said substantially cylindrical actuator gear has a hex shaped hole therethrough.

22. The multiple seal electronic display module as in claim 21, wherein each of said displacement springs has an intermediate segment connected to each of said pair of parallely spaced segments and to said continuous elongated segment wherein said intermediate segments extend through said hollow elongated base and said continuous elongated segment extends at an angle to said rear of said elongated base.

23. The multiple seal electronic display module as in claim 22, wherein said continuous elongated segment extending at an angle to said rear of said elongated base has a pair of parallely spaced segments joined by a curved segment, said curved segment of one of said displacement springs extending towards the right end of said elongated hollow base and said curved segment of said opposite displacement spring extending towards the left end of said elongated hollow base.

24. The multiple seal electronic display module as in claim 23, wherein said substantially cylindrical actuator gear has an O-ring seal between said cylindrical actuator gear and said rear side of said rectangular housing.

25. The multiple seal electronic display module as in claim 24, wherein said rear side of said substantially rectangular housing has a peripheral groove therein and a continuous peripheral rear seal inserted therein, said peripheral rear seal being externally spaced from said elongated base of said elongated latch housing.

26. The multiple seal electronic display module as in claim 25, wherein said LED circuit board has a front side and a rear side, an input signal jack and an output signal jack being secured to said rear side of said LED circuit board and spaced from each other, each of said signal jacks has an upright side wall extending from said rear side of said LED circuit board, said rectangular housing having an opening therein defined by a bevel and an inwardly continuous edge adjoining said bevel, a flexible signal jack base seal surrounding and in contact with said upright side wall of each said signal jacks, each of said flexible signal jack base seals having a continuous base lip and a continuous side wall extending inwardly at an angle with said continuous base lip, said side wall of each of said flexible signal jack base seals having an upper edge contact surface, said continuous lip of each of said flexible signal jack base seals being in contact with said rear side of said LED circuit board, said contact surface of each of said flexible signal jack seals being in pressurized contact with said upright side wall of each of said signal jacks, said continuous side wall of each of said flexible signal jack seals being in pressurized contact with said bevel and said inwardly continuous edge whereby a tight seal is formed between said input and output signal jacks and said rectangular housing upon securing together said rectangular housing, said LED circuit board and said louver panel by said plurality of peripheral spaced fasteners.

27. The multiple seal electronic display module as in claim 26, wherein each of said signal jacks, each of said signal jack base seals and each of said openings in said rectangular housing are substantially rectangular in shape.

28. The multiple seal electronic display module as in claim 27, wherein said rear side of said LED circuit board has a power jack secured thereto, said power jack being spaced from said input and output signal jacks, said power jack having an upright side wall extending from said rear side of said LED circuit board, said rectangular housing having an opening therein defined by a continuous bevel and an interior continuous edge, a flexible signal jack base seal surrounding and in contact with said upright side wall of said power jack, said flexible power jack base seal having a continuous base lip and a continuous side wall extending upwardly from said continuous base lip, said continuous side wall having an upper edge contact surface, said continuous lip of each of said flexible power jack seal being in contact with said rear side of said LED circuit board, said upper edge contact surface of said flexible power jack seal being in pressurized contact with said upright side wall of said power jack, said continuous side wall of said flexible power jack seal being in pressurized contact with said continuous bevel and said interior continuous edge whereby a tight seal is formed between said power jack and said rectangular housing upon securing together said rectangular housing, said LED circuit board and said louver panel by said plurality of peripheral spaced fasteners.

29. The multiple seal electronic display module as in claim 28, wherein said power jack, said flexible power jack base seal and said opening in said rectangular housing are substantially rectangular in shape.

30. The multiple seal electronic display module as in claim 29, wherein said rear side of said LED circuit board has a programming jack secured thereto and spaced from said input and output signal jacks and said power jack, said programming jack is surrounded by a housing extending from said rear side of said rectangular housing, said housing circumscribing an opening in said rectangular housing, an overmolded programming jack seal including a substrate component and an overmold component, said substrate component having a substantially flat panel with an upper surface, a lower surface and an outer edge, a continuous lip extending rearwardly from said lower surface and inwardly from outer edge, said lower surface of said substantially flat panel having concentric continuous grooves therein, said substantially flat panel having a plurality of holes therein between said outer edge and said concentric continuous grooves, said overmold component being of a soft and flexible sealing material and having a substantially flat panel with an upper surface, a lower surface and outer edge, said overmold component having a continuous lip extending rearwardly from said lower surface and inwardly from said outer edge, a plurality of concentric continuous grooves in said upper surface for mating with said concentric continuous grooves of said substrate component, said continuous lip of said overmold component surrounding and in contact with said continuous lip of said substrate component, said overmold component having a plurality of peripheral holes in alignment with said holes in said substrate component, said substrate component and said overmold component forming a unitary cover over said programming jack housing, said programming jack housing having a plurality of openings in an upper surface thereof and in alignment with said holes in said overmolded programming jack seal for receiving fasteners extending therethrough whereby said overmolded component is compressed between sealing surfaces of said programming jack housing and said cover.

31. The multiple seal electronic display module as in claim 30, wherein there is a plurality of electronic display modules attached to a mounting panel for an electronic sign, said mounting panel having a plurality of substantially rectangular openings in which said plurality of electronic display modules is positioned, said mounting panel having an extension tab in each corner of said rectangular openings, each of said extension tabs having an alignment hole therein for receiving said locator posts of said latch housing extensions, said mounting panel of said electronic sign having a front side and a rear side, each of said electronic display modules being supported on said mounting panel by said pair of latch assemblies upon actuation of said actuator gear, whereupon said pair of spaced arcuate arms of each said movable latches is clamped to said rear side of a respective extension tab and whereupon said displacement springs are sandwiched between said front side of said mounting panel and said rear side of said elongated latch housing and whereupon said continuous peripheral rear seal is sandwiched between said front side of said mounting panel and said rear side of said rectangular housing.

32. The multiple seal electronic display module as in claim 30, wherein said programming jack housing and said overmolded programming jack seal are rectangular in configuration.

33. The multiple seal electronic display module as in claim 17, wherein said peripheral spaced fasteners are screws.

34. The multiple seal electronic display module as in claim 20, wherein said fastener through each of said holes is a screw.

35. The multiple seal electronic display module as in claim 25, wherein there is a plurality of electronic display modules attached to a mounting panel for an electronic sign, said mounting panel having a plurality of substantially rectangular openings in which said plurality of electronic display modules is positioned, said mounting panel having an extension tab in each corner of said rectangular openings, each of said extension tabs having an alignment hole therein for receiving said locator posts of said latch housing extensions, said mounting panel of said electronic sign having a front side and a rear side, each of said electronic display modules being supported on said mounting panel by said pair of latch assemblies upon actuation of said actuator gear, whereupon said pair of spaced arcuate arms of each said movable latches is clamped to said rear side of a respective extension tab and whereupon said displacement springs are sandwiched between said front side of said mounting panel and said rear side of said elongated latch housing and whereupon said continuous peripheral rear seal is sandwiched between said front side of said mounting panel and said rear side of said rectangular housing.

* * * * *